United States Patent
Drucker et al.

(10) Patent No.: US 6,185,249 B1
(45) Date of Patent: Feb. 6, 2001

(54) TRANSLATION TABLE DESIGN FOR A PCM MODEM

(75) Inventors: Vitaly Drucker, Stamford; Yuri Okuney, Southbury; Oin Wang, Bristol; Yuri Goldstein, Southbury, all of CT (US)

(73) Assignee: IC Tel Inc., San Jose, CA (US)

( * ) Notice: Under 35 U.S.C. 154(b), the term of this patent shall be extended for 0 days.

(21) Appl. No.: 09/238,320

(22) Filed: Jan. 28, 1999

(51) Int. Cl.[7] ............................. H04B 5/16; H04B 14/04; H04J 3/12
(52) U.S. Cl. .......................... 375/222; 375/242; 370/523
(58) Field of Search .................................. 375/222, 242, 375/295, 261, 265, 298, 308, 279, 377; 370/523

(56) References Cited

U.S. PATENT DOCUMENTS

| | | | |
|---|---|---|---|
| 5,394,437 | * 2/1995 | Ayanoglu et al. | 375/222 |
| 5,406,583 | * 4/1995 | Dagdeviren | 375/5 |
| 5,528,625 | * 6/1996 | Ayanoglu et al. | 375/222 |
| 5,822,371 | * 10/1998 | Goldstein et al. | 375/242 |
| 5,825,816 | * 10/1998 | Cole et al. | 375/222 |
| 5,825,823 | * 10/1998 | Goldstein et al. | 375/286 |
| 5,862,179 | * 1/1999 | Goldstein et al. | 375/242 |
| 5,862,184 | * 1/1999 | Goldstein et al. | 375/295 |
| 5,875,229 | * 2/1999 | Eyuboglu et al. | 379/1 |
| 5,926,505 | * 7/1999 | Long | 375/222 |

FOREIGN PATENT DOCUMENTS

PCT/US95/ 15924 * 12/1995 (WO) .

OTHER PUBLICATIONS

ITU–T Recommendation V.34, Sep. 1994, "Data Communication Over the Telephone Network".*

"The Capacity of PCM Voiceband Channels", Kalet, et al., IEEE Intern'l Conference on Communications'93, pp. 507–511.*

"A Mathematical Theory of Communication". Bell Systems Technical Journal, 27:379–423, 623–656.*

* cited by examiner

Primary Examiner—Chi H. Pham
Assistant Examiner—Khai Tran
(74) Attorney, Agent, or Firm—David P. Gordon; David S. Jacobson; Thomas A Gallagher

(57) ABSTRACT

Methods are provided for generating at least one translation table for a modem having a frame having a plurality of slots. DIL sequence information from another modem is used to generate ordered table of levels, and distances between adjacent levels of the ordered table for found for each slot. The distances are used to distinguish between slots subject to robbed bit signaling (RBS) and slots not subject to RBS, and the ordered tables are used to make a determination as to whether the DIL sequence information is A-law or $\mu$-law information. Scaling factors are generated from the A-law/$\mu$-law determination as well as from a PAD estimation, and the scaling factors are utilized in generating translation tables. A PAD estimation function is utilized in finding the PAD estimation.

27 Claims, 17 Drawing Sheets

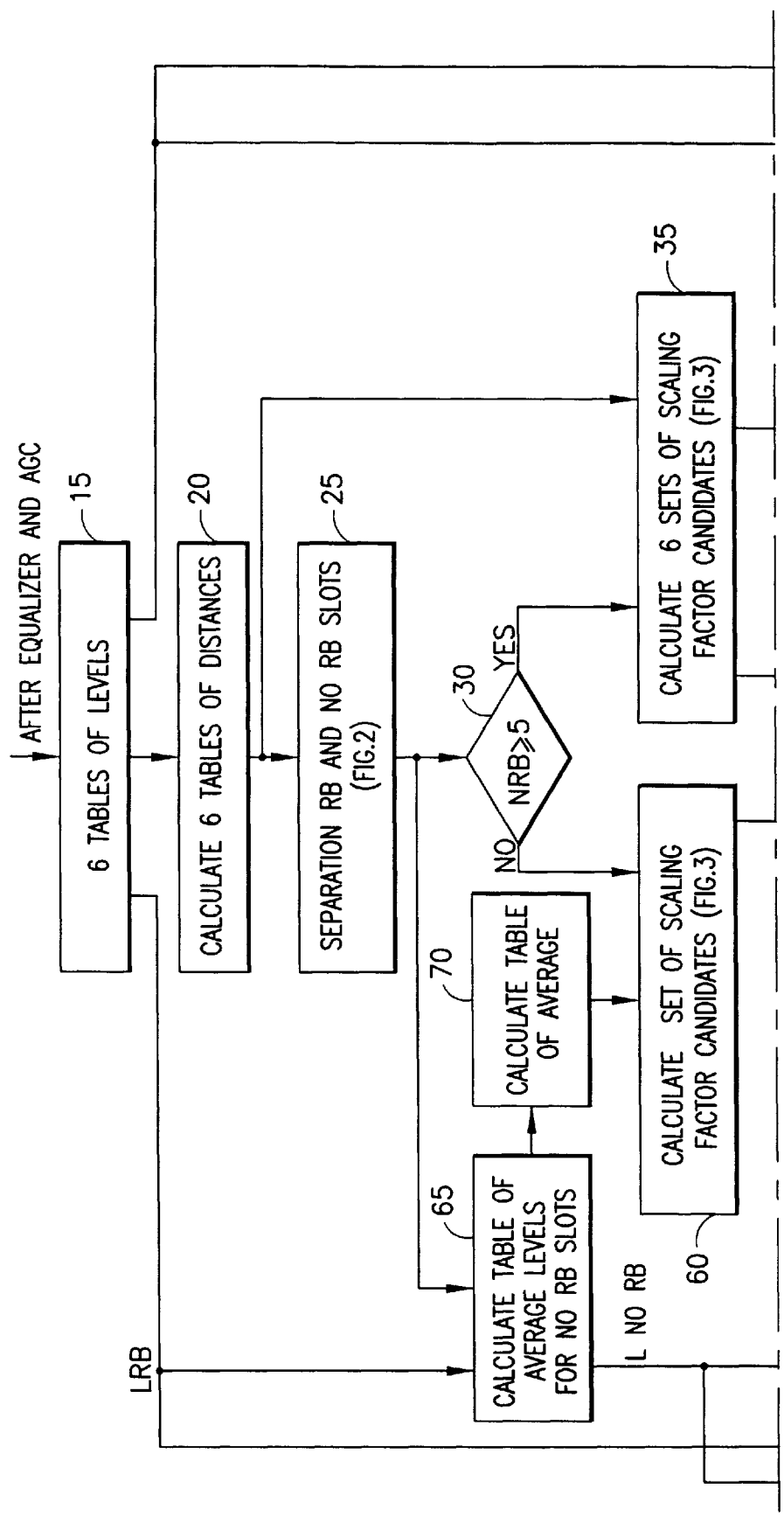

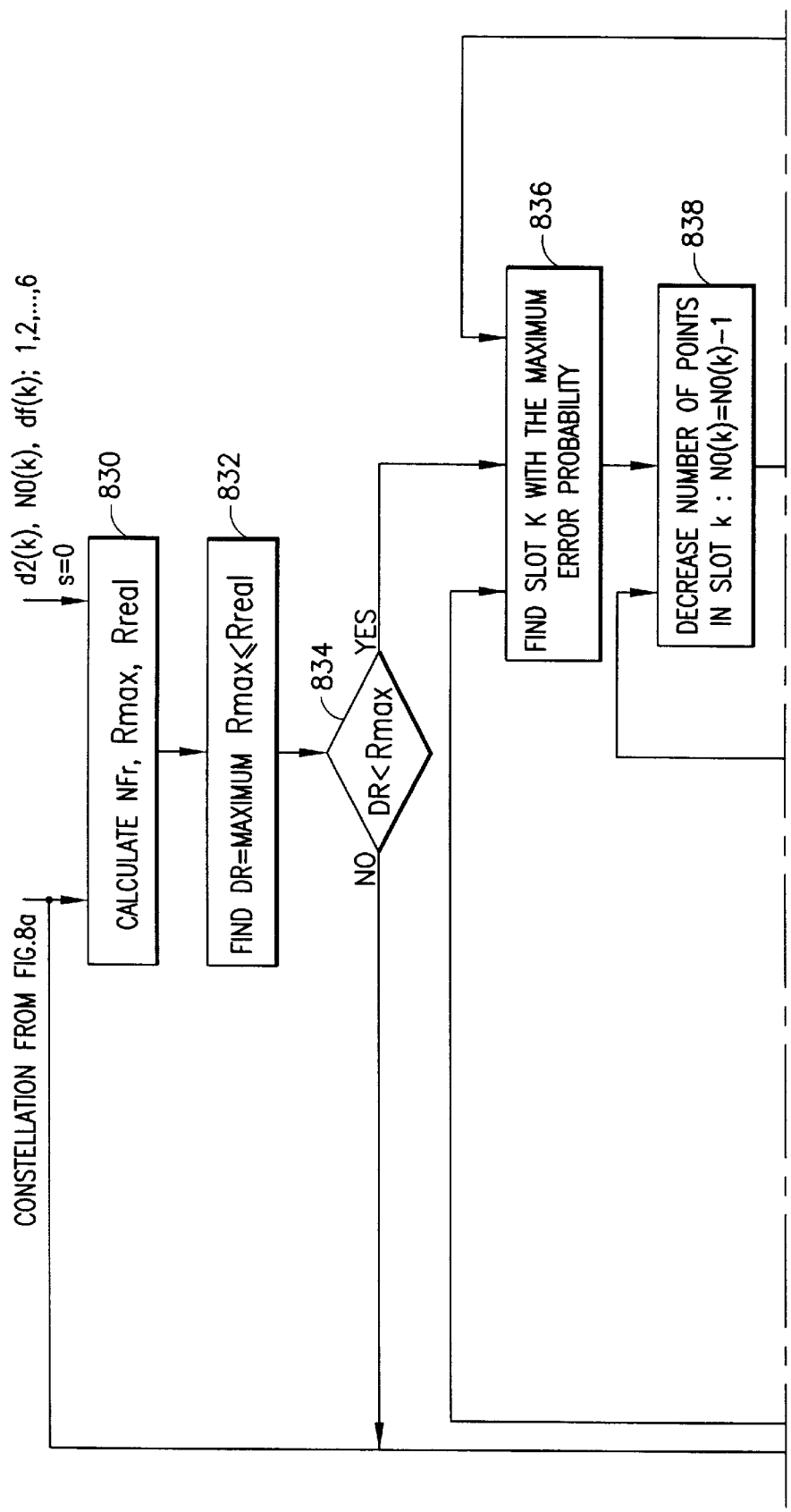

TRANSLATION TABLE DESIGN FOR A PCM MODEM

The present invention is related to co-owned U.S. Ser. No. 08/801,066 now issued as U.S. Pat. No. 5,822,371, U.S. Ser. No. 08/807,955 filed Mar. 4, 1997, U.S. Ser. No. 08/838,367 filed Apr. 8, 1997, U.S. Ser. No. 08/851,597 now issued as U.S. Pat. No. 5,825,816, and U.S. Ser. No. 08/870,684 now issued as U.S. Pat. No. 5,825,823, all of which are hereby incorporated by reference herein in their entireties.

BACKGROUND OF THE INVENTION

1. Field of the Invention

The present invention relates to data communications equipment. More particularly, the present invention relates to translation tables and constellation designs for a PCM modem and methods of generating the same.

2. State of the Art

With the ever-increasing importance of telecommunications for the transfer of data as well as voice, there has been a strong effort to increase data transfer rates over the telephone wires. In 1994, the ITU-T adopted the V.34 Recommendation (International Telecommunication Union, Telecommunication Standardization Sector Recommendation V.34, Geneva, Switzerland 1994). The V.34 standard and subsequent amendments define modem operating speeds of 28.8 kbps up to 33.6 kbps, and the vast majority of modems being sold today adhere to the V.34 Recommendation. However, with the explosion in the use of the Internet, even at the V.34 transfer rates, downloading of large files available on the Internet can take long periods of time. Thus, even as the V.34 standard was being adopted, there was a thrust to provide additional standards recommendations which would increase data transfer rates even further.

Recognizing that further increases in data rates is theoretically limited where the telecommunication network is an analog system (see C. E. Shannon, "A Mathematical Theory of Communication," *Bell System Technical Journal*, 27:379–423, 623–656 (1948)), there have been various proposals to take advantage of the fact that much of the telecommunication network is now digital. For example, U.S. Pat. No. 5,394,437 to Ayanoglu et al., U.S. Pat. No. 5,406,583 to Dagdeviren, and U.S. Pat. No. 5,528,625 to Ayanoglu et al. (all assigned to AT&T/Lucent and all of which are hereby incorporated by reference herein in their entireties) all discuss techniques which utilize the recognition that the network is mostly digital in order to increase data transmission rates to 56 kbps and higher. Similarly, Kalet et al., "The Capacity of PAM Voiceband Channels," *IEEE International Conference on Communications '93*, pages 507–511 Geneva, Switzerland (1993) discusses such a system where the transmitting end selects precise analog levels and timing such that the analog to digital conversion which occurs in the central office may be achieved with no quantization error. PCT application number PCT/US95/15924 (Publication WO 96/18261) to Townshend which is hereby incorporated by reference herein in its entirety) discusses similar techniques. All of the disclosures assume the use of PAM (pulse amplitude modulation) digital encoding technology rather than the QAM (quadrature amplitude modulation) currently used in the V.34 Recommendation. The primary difference between the AT&T technology and the Townshend reference is that the AT&T technology suggests exploiting the digital aspect of the telephone network in both "upstream" and "downstream" directions, while Townshend appears to be concerned with the downstream direction only. Thus, systems such as the "x2" technology of US Robotics which are ostensibly based on Townshend envision the use of the V.34 Recommendation technology for upstream communications.

Recently, a new Recommendation for standard was adopted by the ITU-T for the purposes of standardizing a PCM-type modem. The new standard, known as "V.90", which is hereby incorporated by reference herein in its entirety, relates primarily to the transmitter of a PCM-type modem. In Section 8.4.1, the V.90 Standard requires the provision of a probing signal; also known in the art as digital impairment learning or "DIL". The purpose of the DIL is to give the receiver of the receiving (analog) modem the opportunity to measure network impairments. The measurements and determinations made by the receiving modem are used by the receiving modem in formulating an appropriate constellation for the transfer of data. The constellation formulated by the receiving modem is transmitted back to the transmitting modem as a DIL descriptor set forth in Section 8.3.1 of the V.90 standard.

While much attention has been paid in the prior art to the transmitter in the V.90 modem, it will be appreciated that ability to design an appropriate transmission constellation plays a critical role in producing a high quality modem. In particular, according to V.90, the transmitter transmits 8-bit binary numbers (octets) which correspond to 128 positive and 128 negative $\mu$-law or A-law levels. These octets go through the digital network and are finally transformed into analog levels in a digital-to-analog (D/A) converter in the central office. To maximize data rates in the presence of network impairments, an optimal signal constellation must be utilized. Thus, it is necessary to relate (correspond) the transmitted octets to the levels received at the D/A output. This relation or correspondence is accomplished by reference to a translation table. Determination of the translation table is not a trivial task because the digital channel has uncertain parameters and the PCM signal is subjected to both digital and analog distortions including digital attenuation (PAD), robbed bits, etc. However, preparation of an appropriate translation table is critical to the high-quality functioning of the data communications. In addition, the translation table is necessary for generating an appropriate constellation design.

SUMMARY OF THE INVENTION

It is therefore an object of the invention to provide methods for generating translation tables in the receivers of PCM modems, and apparatus which utilize the methods.

It is another object of the invention to provide methods for generating translation tables in the receivers of PCM modems where account is made for digital and analog impairments.

If is a further object of the invention to provide methods for optimizing construction of constellation design based on translation table determinations.

It is an additional object of the invention to provide algorithms useful for generating translation tables in V.90-type modem receivers.

In accord with the objects of the invention, in generating translation tables, the receiver of the invention utilizes information regarding each of the slots of the received signal. In particular, for each slot, the receiver must first determine: a) whether any of the slots are subjected to some type of robbed-bit-signaling, b) an estimation of the scaling factor, c) an estimation of the PAD applicable to the session, and d) the code (A-law or μ-law) utilized. More particularly, the receiver receives a DIL probing signal and separates the signal slot by slot into tables of signal levels which are ordered (e.g., by value), and stored. From the tables of signal levels, tables of distances between the adjacent levels are calculated and stored. According to a first preferred aspect of the invention, based on the number of zero distances (i.e., distance between adjacent levels=zero) calculated, a determination is made for each slot as to whether or not that slot has been subjected to robbed bits.

According to a second preferred aspect of the invention, the tables of distances are used in finding candidate scaling factors for each of the slots. More particularly, N distances representing the sequence of the distances between N+1 probing signal levels are preferably utilized by comparing them to upper and lower bounds which are functions of the first three non-zero components of the sequence. The number of members of the set of distance differences falling within the range defined by the upper and lower bounds is determined, along with a first average which is the average of those distances. The N distances are then compared to upper and lower bounds which are a function of the previously determined first average to provide a second set of distances and a second average. In the preferred embodiment, this process is repeated to obtain third, fourth and fifth sets and third, fourth, and fifth averages. The sum of the first through fifth numbers is calculated for each of the three non-zero components, and the largest sum is used to identify the non-zero component from which the scaling factor is calculated. Thus, the five averages for that component are used in an equation which provides an average final distance. In the preferred embodiment, the average final distance relates to the distance utilized in the highest sector multiplied by a scaling factor.

According to a preferred embodiment of the second aspect of the invention, where there are two or more non-robbed bit slots, the N distances which are calculated are generated from the average values of each of the levels utilized. Only a single set of candidate scaling factors is calculated as opposed to a separate set of candidate scaling factors for each slot.

According to a third aspect of the invention, whether the incoming signal is coded according to A-law or according to μ-law is determined by calculating the value of an A-law/μ-law separation function, and then comparing the value of the function to a predetermined threshold. More particularly, a preferred separation function is $$F1(n1, n2) = \sum_{i=n1}^{i=n2} \{L(i) - 2^y * [L(i - 16y)]\},$$

where L(i) is the i-th positive level, and y is a positive integer preferably equal to one. For A-law levels without noise (and with any PAD attenuation), for any n2>n1≧33, F1(n1,n2) will be zero. On the other hand, for μ-law levels without noise and with 0 dB PAD attenuation, F1(n1,n2)= 33(n2−n1+1). According to the preferred embodiment of the invention, the value for the separation function F1(64,128) is calculated for any non-robbed-bit signal within the frame, or for the average of non-robbed-bit signals. Then, the value for the separation function is compared to a threshold (e.g., five hundred). If the value of the separation function exceeds the threshold, the signal is determined to be a μ-law signal. Conversely, if the value of the separation function does not exceed the threshold, the signal is determined to be an A-law signal.

According to a fourth aspect of the invention, a method for choosing a final scaling factor Scf for A-law and/or linear μ-law channels includes calculating a PAD estimation function and comparing the value of the calculated PAD estimation function to a series of thresholds to determine whether or not the PAD is <6 dB. More particularly, the preferred PAD estimation function is $$F2(n1, n2) = \sum_{i=n1}^{i=n2} abs\{L(i) - 2^y * [L(i - 16y)]\},$$

where L(i) is the i-th positive level (where n1≧17 and n2≦128) received in a non-robbed-bit slot for the case where there are two or more non-robbed-bit slots, and y is a positive integer preferably equal to one. In accord with the preferred embodiment of this aspect of the invention, the pad estimation function is calculated for levels sixty-four and one hundred twenty-eight for non-linear channel μ-law PCM signal PAD estimation, and for levels thirty-three and fifty-eight of A-law PCM signal PAD estimation. Then, the pad estimation function is corrected by subtracting a bias correction, which for both μ-law and A-law PCM signals may be taken as zero if the signal to noise ratio (SNR) is greater than 40 dB. If the SNR is less than 40 dB, for μ-law signals, the bias correction may be taken as 15(40−SNR(dB)); whereas, for A-law signals, the bias correction may be taken as 5(40−SNR(dB)). The bias-corrected pad estimation function is then compared to a series of thresholds for distinguishing, e.g., 0 dB and 6 dB, 1 dB and 7 dB, 3 dB and 9 dB, etc., and the PAD determination is then used to select which of the candidate scaling factors is the final scaling factor Scf.

According to a fifth aspect of the invention, for non-linear μ-law channels (and, if desired for linear μ-law channels), the final scaling factor Scf is determined as follows. In order to find the PAD attenuation and final scaling factor in a nonlinear channel, a distance function Ldel(i,Δ) is defined, Ldel(i,Δ)=L(i)−2L(i−Δ), where L(i) is the value of the i-th level of the scaled DIL sequence at the output of the equalizer, and Δ is the given shift between the compared indexes. Among the distances calculated according to the distance function will be commonly recurring distances (LdelC), and other distances. The commonly recurring distances have been found to be strongly connected with PAD attenuation and a final desired scaling factor Scf according to LdelC=33·($10^{PAD/20}$)=33/Scf. In addition, for a perfect DIL sequence and Δ=16, it can be shown that LdelC=$\max_i$(Ldel(i,16)). The minimum index i which provides for Ldel(i,Δ)=LdelC and which is designated $i_{min}$ is a function of the PAD attenuation and Δ. In accord with the fifth aspect of the invention, the expected common distances LdelC are calculated according to LdelC1=33/Sc1; LdelC2=66/Sc1; LdelC3=132/Sc1, where Sc1 is the largest of the three candidate scaling factors determined according to the fourth aspect of the invention, 1≦Sc1≦2, scaling factor Sc2=(Sc1)/2 and scaling factor Sc3=(Sc1)/4. The index $i_{min}$ is then calculated in order to select and accumulate Ldel(i,Δ). In order to avoid accumulating distance values for Ldel(i,Δ) which are too low, a threshold value Th1 is selected which is a monotonically increasing function of the expected PADmax. Then, for i from i=$i_{min}$ to i=($i_{min}$+$N_i$), distances Ldel(i,16) are compared to the threshold Th1, and those exceeding the threshold are selected and averaged. The average value is taken as an LdelC estimate which is denoted D1. The LdelC estimate is then compared to the LdelC1, LdelC2, and LdelC3 calculations, to find the minimum difference. The minimum difference points to the candidate scaling factor which is taken as the final scaling factor Scf.

According to a sixth aspect of the invention, indications and determinations of nonlinearity can be made by comparing the average common distance obtained according to the fifth aspect of the invention to a second average common distance obtained in the same manner, but which relates to a different index range. An indication of nonlinearity can then be defined as an absolute difference between the average common distances, and a reasonable threshold can be set to define the channel as nonlinear or linear. In addition, a quantitative estimate of nonlinearity in decibels can be generated from either the average common distance information, or from a determination of PAD as obtained from another aspect of the invention. The determination of nonlinearity can be used, if desired, for translation table design. Thus, if NL is large, a scaled DIL sequence may be substituted for the regular translation table.

According to a seventh aspect of the invention α-codec-type robbed-bit signaling is distinguished from β-codec-type robbed-bit signaling (also called half-robbed-bit signaling) by comparing the levels of received signals for each of the slots, finding the number of zero distances (or conversely, the number of non-zero distances) between corresponding values in the different slots, and comparing the number of zeros distances (or non-zero distances) to a threshold. Ideally, the number of zero-difference distances between a non-robbed-bit and a half-robbed-bit slot will be zero; the number of zero-difference distances between a non-robbed-bit and another non-robbed bit slot will be equal to the number of levels checked (i.e., all comparisons will result in a zero difference); and the number of zero-difference differences between a non-robbed-bit slot and a robbed-bit slot will be up to sixty-four (for one hundred twenty-eight levels). Thus, where a particular slot shows hardly any zero differences between its levels received and the levels received by other slots, that slot is declared to be a half-robbed-bit slot.

According to an eighth aspect of the invention, translation tables are generated by using information regarding whether A-law or μ-law is being utilized, whether α-codec type or β-codec type robbed bit signaling is being utilized, and the final scaling factor determinations. For each slot, each level of the received probing signal L(i) is multiplied by the final scaling factor Scf for that slot to provide a scaled level (Ls(i)). The scaled levels Ls(i) for that slot are compared to the standard values of its appropriate slot-type (A-law, μ-law α-codec, or μ-law β-codec). If the scaled level is within a predetermined percent on either side of a midpoint between adjacent standard values, that point is discarded. Where more than one scaled level Ls(i) maps to a single standard value, only one of the scaled levels may be utilized in the constellation, and the other(s) discarded.

According to a ninth aspect of the invention, constellations are designed by utilizing the six translation tables generated according to other aspects of the invention, as well as power limit information, and minimum distance (d0) information between received constellation points. According to this aspect of the invention, constellations are designed by optimizing, independently for each slot, the distances between constellation points used for that slot. Optimization is accomplished by, first, choosing a maximum number of points from the translation table for the constellation having at least the minimum distance d0 without exceeding a power limitation; and then, using the determined maximum number of points, attempting to increase the minimum distance in the constellation without exceeding the power limitation.

According to a tenth aspect of the invention, constellations are further optimized by, where possible decreasing the number of points in a particular constellation without affecting the total data rate of the frame. This further optimization is accomplished by, first, calculating a maximum potentially achievable data rate Rmax given the number of points which are in each of the six constellations, and comparing that rate to a standards-permitted data rate DR; and then, if Rmax exceeds DR, by decreasing the number of points in one or more constellations, provided the decrease in the number of points does not cause a recalculated Rmax to drop below DR. In accord with a preferred embodiment of this aspect, the slot having the maximum error probability is the slot whose number of points is reduced, and a new constellation for that slot is generated utilizing the method of the ninth aspect of the invention described above.

According to an eleventh aspect of the invention, the constellations are even further optimized by attempting to increase the minimum distance between points in one or more slots having the maximum error probability by permitting that slot(s) to exceed power limitations, provided the average power of the frame is not exceeded. This further optimization is accomplished by finding the slot with the maximum error probability, increasing the minimum distance between points in the located slot (while maintaining the number of points in its constellation) and thereby exceeding frame power limitations for that slot, and checking to see whether the changes to the constellation in that slot violates the average frame power limitations. If frame power limitations are violated, the constellation is not changed. On the other hand, if the frame power limitation is not exceeded, the constellation is changed, and the procedure is repeated.

With the constellation optimization methods of the ninth, tenth, and eleventh aspects of the invention, constellations are generated for the six slot frame. Together, the methods substantially reduce the bit error rate (i.e., increase the reliability) of the modem while maintaining a high data rate.

According to a twelfth aspect of the invention, a simple system for checking average constellation power is provided. According to this aspect of the invention, simply calculated estimated average frame power upper and lower boundaries (Pub and Plb) can be calculated and compared to the power limitation for the frame (Pmax). If Plb exceeds Pmax, then a power violation is declared, and if Pub is greater than Pmax, then there is no power violation. However, if Plb does not exceed Pmax, but Pub is less than or equal to Pmax, then an indicator r is calculated, r=| (Pmax−Pub)/(Pmax−Plb)|. If r is greater than or equal to four, a power violation is declared, and otherwise, there is no power violation.

BRIEF DESCRIPTION OF THE DRAWINGS

FIG. 1$b$ is a flow chart of the method of designing appropriate constellations for utilizing the translation tables of FIG. 1$a$ according to the invention.

FIG. 4$a$ is a graph of an A-law/μ-law separation function versus PAD attenuation.

FIG. 5 is a flow chart of the method of estimating the digital PAD impairment and selecting a final scaling factor as required in FIG. 1a.

FIG. 6 is a flow chart of the method of distinguishing robbed-bit signaling from half-robbed-bit signaling as required in FIG. 1a.

FIG. 7 is a flow chart of the method of generating translation tables from information previously determined from the methods of FIGS. 4–6 as required in FIG. 1a.

DETAILED DESCRIPTION OF THE PREFERRED EMBODIMENTS

Figures 1, 1A, 2:
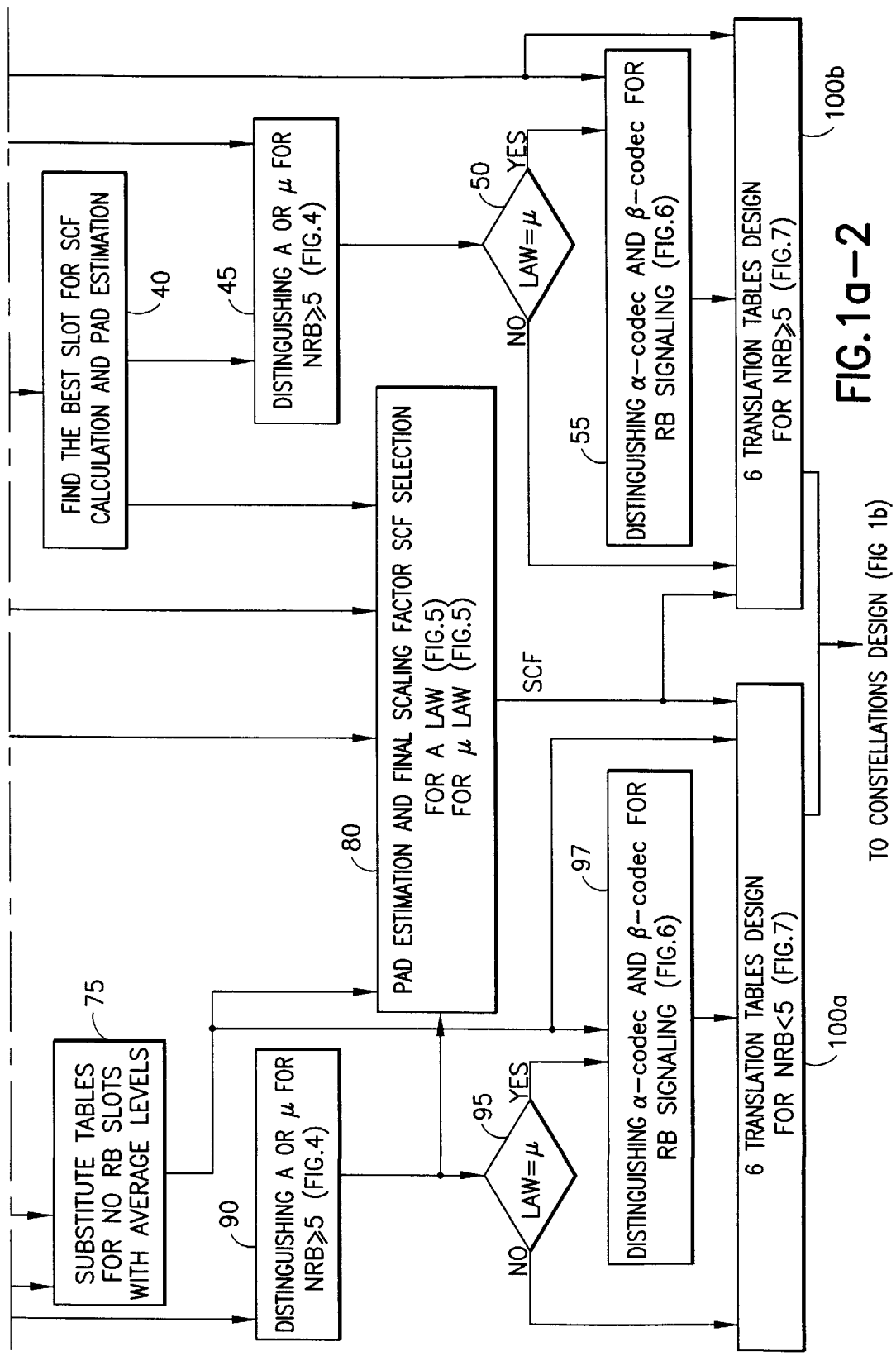
FIG. 1$a$ (represented as FIGS. 1$a$-1 and 1$a$-2, on two separate sheets) is a flow chart of the method of generating translation tables according to the invention.
FIG. 2 is a flow chart of the method of separating robbed bit and non-robbed bit slots as required in FIG. 1$a$.

Before turning to FIG. 1a, some background is helpful regarding the types of impairments encountered in the telecommunications channel which gives rise to the need for a translation table. Data sent over a channel is subject to digital attenuation, robbed bits, robbed bit conventions (e.g., $\alpha$-codec or $\beta$-codec), uncertainty of PCM conversion (i.e., A-law or $\mu$-law), and unknown analog attenuation in the channel. More particularly, according to the G.121 Recommendation, digital attenuation (PAD) ranges from 0 dB to 10.5 dB depending on geographical area. The most typical attenuations in the USA are 3 dB and 6 dB. The most typical PAD in Europe is 7 dB. PAD attenuation leads to considerable changes in signal mapping. For example, an original $\mu$-law level 8031 (code 127), after being subject to a 3 dB PAD will be received as level 5727 (code 118); while the same level after being subject to 6 dB PAD will be received as level 3999 (code 111).

In $\mu$-law networks, robbed bit signaling can change one bit in a transmitted octet, and can therefore lead to change in the received signal. For example, level 8031 (octet 10000000) when subjected to having a robbed bit will be received as level 7775 (octet 10000001). It should be appreciated that there are three modifications of robbed bit (RB) impairments which may be encountered: robbed bit before pad (RBb), robbed bit after PAD (RBa), and robbed bit both before and after PAD (RBba). Each of these situations will result in different signal changes.

In addition to the different RB modifications, there are two different robbed bit conventions: full robbed bit ($\alpha$-codec type) and half robbed bit ($\beta$-codec type). The half robbed bit convention shifts the transmitted level by half the distance between levels, and may utilized in only one slot within a frame. Thus instead of an 8031 value level becoming 7775 as discussed above utilizing regular robbed bit, in the hRB convention, the value would become 7903 (half-way between 7775 and 8031).

In addition to digital attenuation and robbed bit signaling, modem receivers must account for analog attenuation or gain in the channel as well as for two different types of PCM conversion (A-law and $\mu$-law) which may be utilized. The two different PCM conversion have different signals at the output of the D/A converter. A PCM modem receiver does not know in advance which type of signal it will be receiving.

Turning now to FIG. 1a, the method of the invention for generating translation tables is shown. It will be appreciated that all the methods of the invention may be carried out utilizing one or more of hardware, firmware or software (typically involving one or more of microprocessors, DSPs, and memory). The incoming signal is assumed to be a DIL probing signal which has been equalized and subject to automatic gain control (AGC). At 15, the DIL signal is separated slot by slot (typically six slots) into tables which are preferably ordered and stored. At 20, tables of distances between the levels are calculated and stored. Thus, where all one hundred twenty-eight values are sent and stored for a slot in a table at step 15, one hundred twenty-seven distances would be calculated for that slot and stored in a table at step 20. Based on the distances, and according to a method discussed below in detail with reference to FIG. 2 which recognizes that robbed bits cause many more zero distances to be found, a determination is made at 25 as to whether the slot has been subjected to robbed bits or not.

According to the preferred embodiment of the invention, at 30 a determination is made as to the number of slots which are subject to robbed bit signaling. If the number of robbed bit slots is five or six (i.e., there is only one or zero non-robbed bit slots), at 35 six sets of candidate scaling factors Scf are calculated (one set for each of the six slots) according to a method discussed below in detail with reference to FIG. 3. The six sets of candidate scaling factors are provided as one input to the PAD estimation and final scaling factor selection at 80 as discussed below. In addition, at 40, the slot having the largest number of "typical" points (as discussed below) is chosen. The distances calculated at step 20 for that slot are then used in a determination made at step 45 as to whether A-law or $\mu$-law is being utilized (as discussed in detail in FIG. 5) and that determination is provided to the PAD estimation and final scaling factor selection step 80. Where A-law is being utilized, at step 50, that fact is forwarded to step 100b where the translation tables are designed. If $\mu$-law is being utilized, a determination is made (as set forth in detail with reference to FIG. 6) at 55 (and utilizing the tables stored at 15) as to whether robbed bit or half robbed bit signaling is being utilized in each slot. The results are forwarded to the translation table design step 100b, as are the six tables of levels stored at step 15.

Returning to step 40, the slot chosen as having the largest number of typical distances (typically a non-robbed bit slot) is used in a PAD-estimation algorithm (discussed below in detail with reference to FIG. 4) in determining the likely PAD impairment of the channel and in determining a final scaling factor at 80. The result of that determination is provided to the translation table design step 100b (as well as translation table design step 100a). As seen in FIG. 1a, the translation table design conducted at 100b also utilizes the tables determined at 15, the A-law/$\mu$-law determination of step 50, and the robbed-bit/half-robbed-bit determination of step 55.

Returning to step 30, when it is determined that fewer than five slots are subjected to robbed bit signaling, then candidate average scaling factors are calculated at 60 according to the method shown in FIG. 3 and the candidate average scaling factors are forwarded to step 80 (discussed in more detail below with reference to FIG. 4). As seen in FIG. 1a, in calculating the average scaling factor, certain information is required. Thus, at 65, using information from step 25 as to which slots are not subject to robbed bit signaling, and the tables of levels for those slots (from step 15), a table of average levels for the non-robbed-bit slots is calculated. Using the average levels calculated at 65, a table of distances between the average levels is calculated at 70. The table of distance between average levels is utilized at 60 in calculating an average scaling factor as discussed below with reference to FIG. 3. The table of average levels for the non-robbed-bit slots calculated at 65 is also utilized at step 75. In particular, at step 75, a new set of six tables of levels is stored, where for each non-robbed-bit slot, the table stored for that slot at step 15 is utilized; and where for each robbed-bit slot, the table of average levels calculated at step 65 is utilized in lieu of the table stored at step 15. These tables are utilized in the PAD estimation and final scaling factor selection step 80 as discussed in more detail below with respect to FIG. 4.

The table of average levels for non-robbed-bit slots calculated at 65 and used in generating the set of six tables at step 75, is also utilized in the algorithm (discussed in more detail with reference to FIG. 5) at step 90 in distinguishing whether A-law or $\mu$-law is being utilized. The determination of step 90 is provided to the PAD estimation and final scaling factor selection step 80. In addition, where A-law is being utilized, at step 95, that fact is forwarded to step 100a where the translation tables are designed. If $\mu$-law is being utilized, a determination is made (as set forth in detail with reference to FIG. 6) at 97 (and utilizing the tables stored at 75) as to whether robbed bit or half robbed bit signaling is being utilized in each slot. The results are forwarded to the translation table design step 100a, as are the six tables of levels stored at step 75.

Figure 1B:
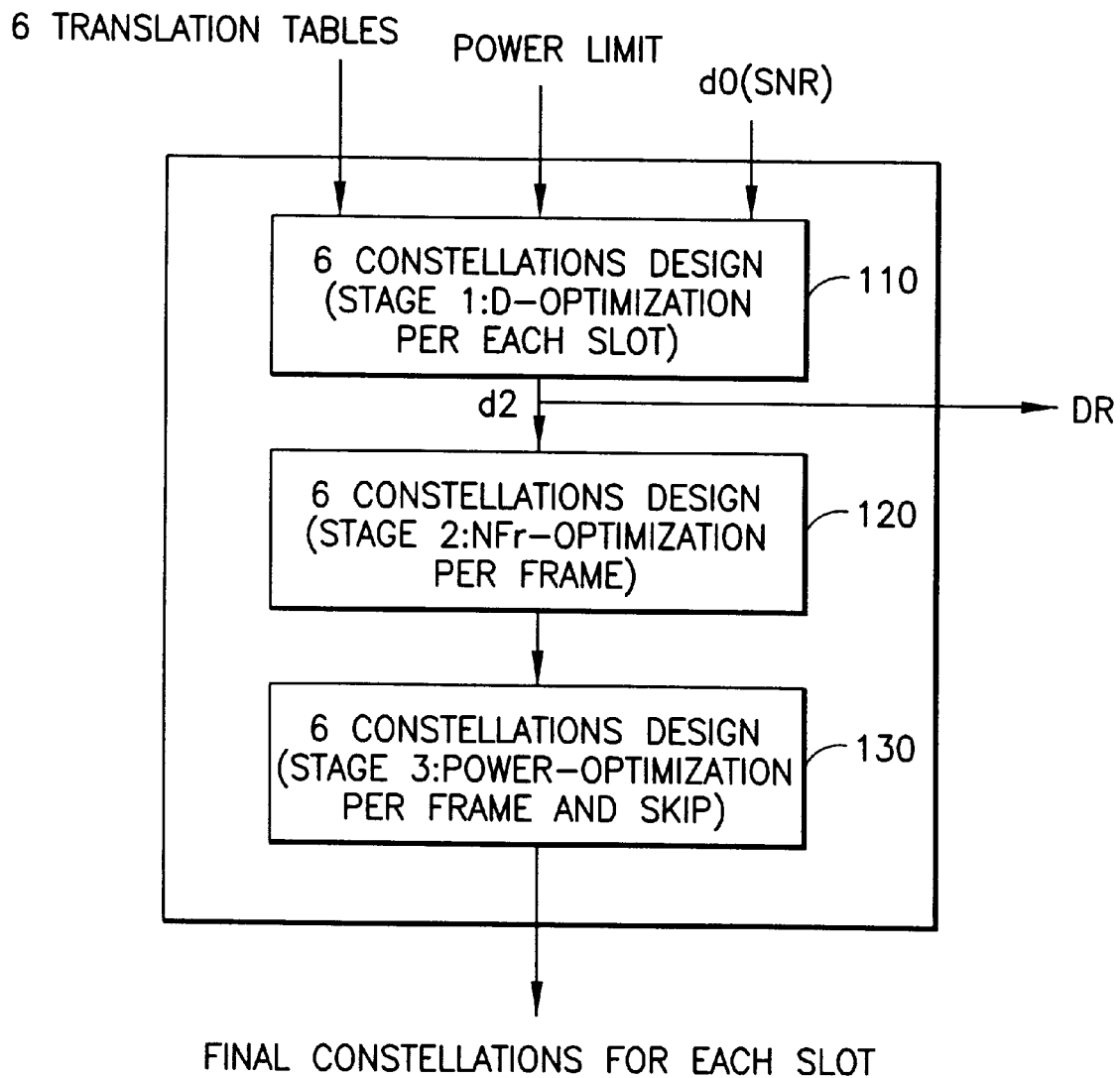
Figure 2:
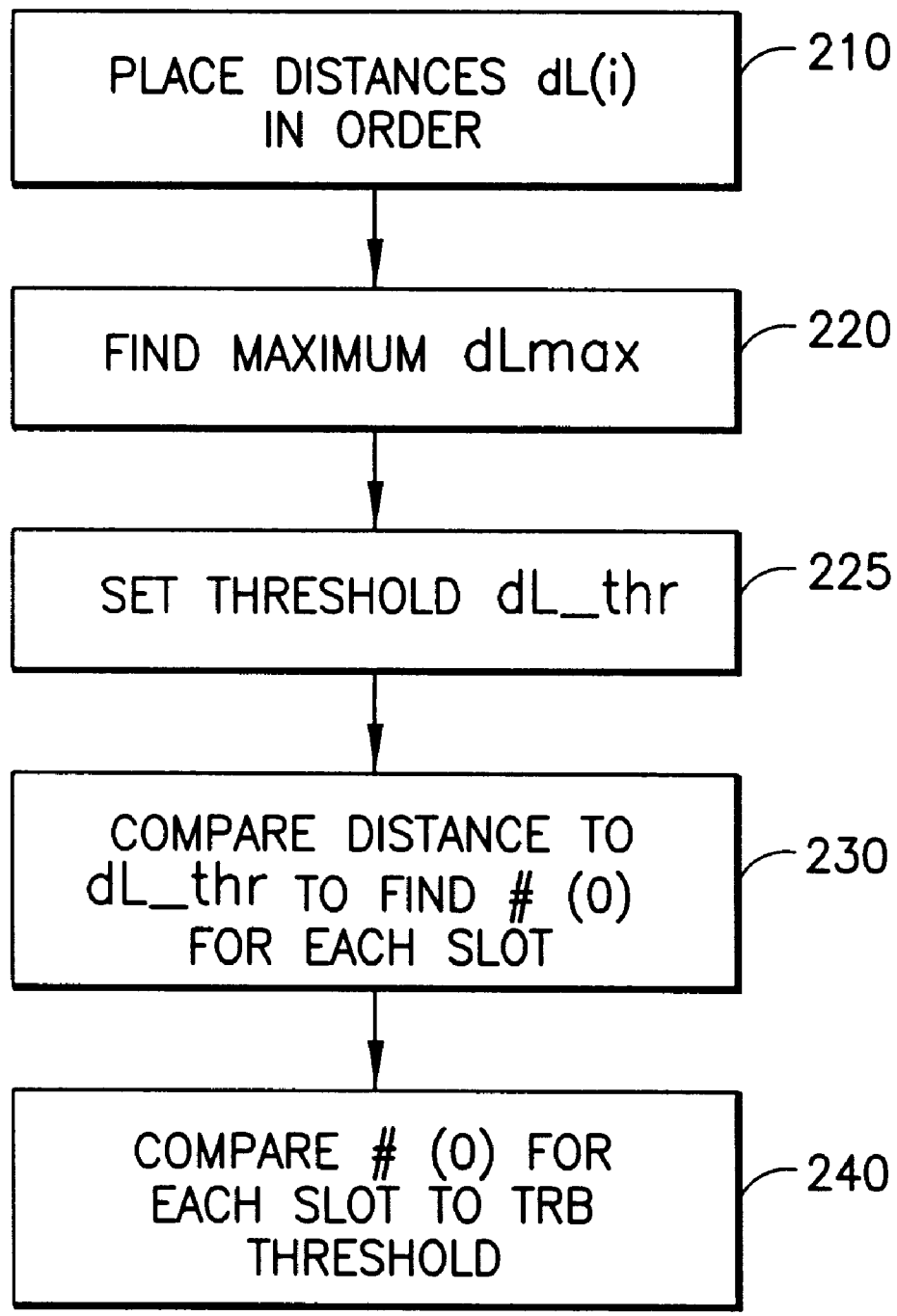
Figure 8A:
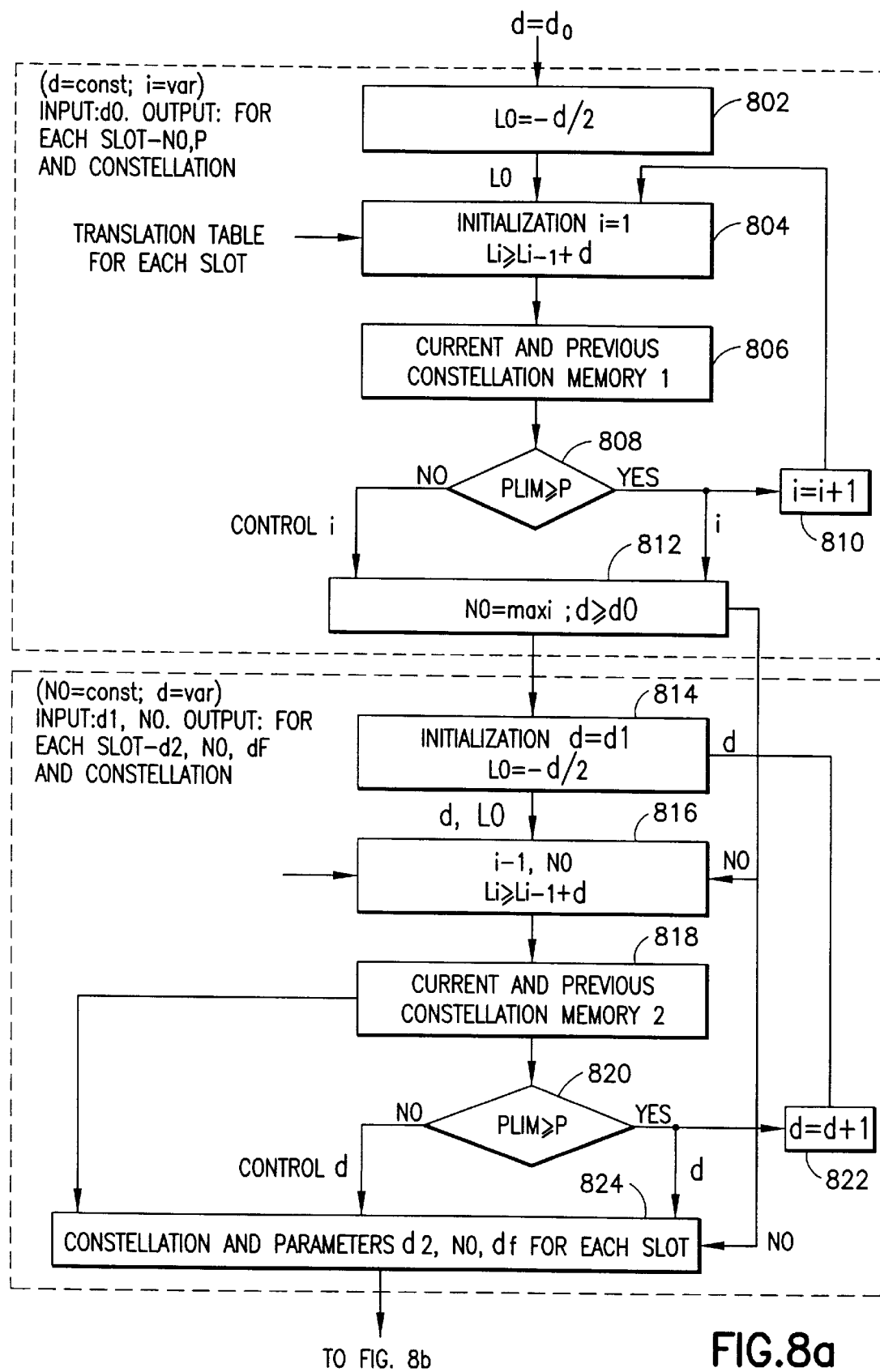
FIG. 8a, FIG. 8b (represented as FIGS. 8b-1 and 8b-2, on two separate sheets) and FIG. 8c are flow charts of steps set forth in FIG. 1b.

According to a preferred aspect of the invention, and as seen in FIG. 1b, the translation tables generated at 100a or 100b are utilized in the design of a constellation. More particularly, the six translation tables, a power limit, and the minimum distance (d0) between received constellation points are provided to a first stage 110 of the constellation design. First stage 110, which is discussed in more detail below with reference to FIG. 8a, is designed to optimize, independently for each slot, the distances between constellation points used for that slot. The output of the first stage 110 is provided to a second stage 120 which is designed to optimize distances for the whole frame (the sequence of six slots) under power limitations for each slot independently. Details of the second stage optimization are discussed in more detail below with reference to FIG. 8b. The output of the second stage is provided to a third stage 130 which is designed to optimize the power of the six constellations for the whole frame. Again, the third stage optimization is discussed in more detail below with reference to FIG. 8c.

Turning now to FIG. 2, a flow chart is provided of the method of separating robbed bit and non-robbed bit slots as required at step 25 of FIG. 1a. As set forth in FIG. 1a, tables of distances between the received levels (for each slot) are provided as inputs. According to the preferred embodiment, at 210, the distances dL(i) between adjacent received levels L(i) for each slot are ordered. At 220, the maximum distance dLmax of the values for dL(i) for each slot is found. The maximum distance is then used at 225 to generate a zero distance threshold dL_thr where dL_thr is preferably set equal to dLmax/16. At 230, for each slot, the distances calculated at step 210 are compared to the zero distance threshold to find the number of "zero distances" (#0) in the slot; where a zero distance is taken as dL(i)<dL_thr. The number #0 for each slot is then compared at 240 to a threshold value Trb to determine whether or not the slot is subject to robbed bit signaling. Preferably, the Trb threshold is chosen as twenty-five, because it has been determined that when there is no robbed-bit-signaling, but the channel is subject to PAD attenuation in the range of between 0 and 12 dB, the number of zero distances will not exceed eighteen (for one hundred twenty-seven distances calculated from one hundred twenty-eight levels) as seen in Table 1 below.

TABLE 1

| PAD, dB | 0 | 3  | 6 | 10 | 12 |
|---------|---|----|---|----|----|
| #0      | 0 | 13 | 4 | 18 | 14 |

On the other hand, where there is robbed-bit-signaling, but the PAD distortion=0 dB, there will be thirty-two zero distances for sixty-four levels, as the least significant bit of every other level will be changed. Where the PAD distortion is added to the robbed-bit-signaling, the number of zero distances will increase (i.e., more than thirty-two zero distances will be calculated), as more levels can be duplicated. Thus, the threshold Trb is preferably taken as twenty-five, which is half-way between the maximum number of zero distances likely to be encountered when there is no robbed-bit-signaling (18), and the minimum number of distances likely to be encountered when there is robbed-bit-signaling (32).

Figure 3:
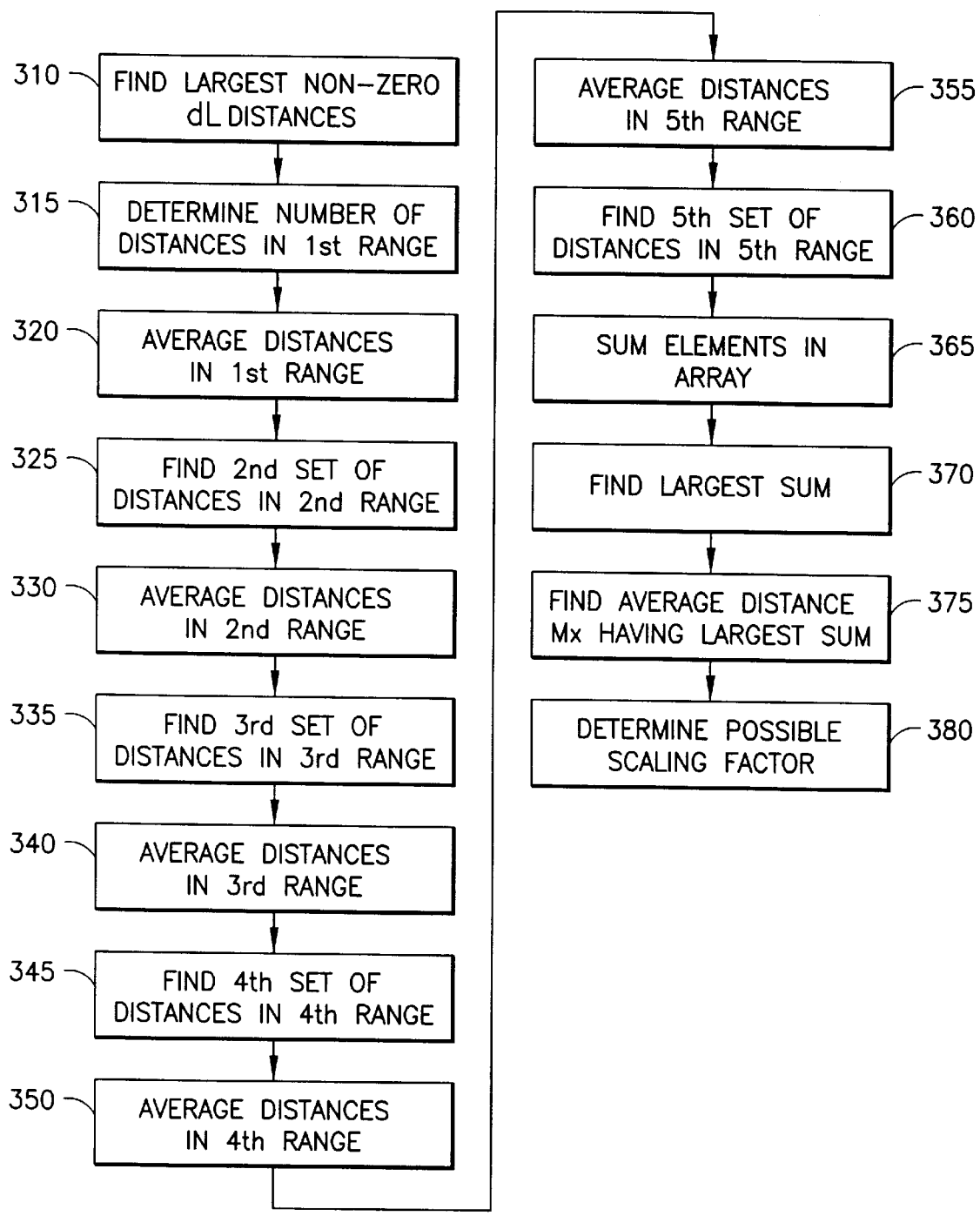
FIG. 3 is a flow chart of the method of generating scaling factor candidates as required in FIG. 1$a$.

FIG. 3 is a flow chart of the method of generating a scaling factor as required at steps 35 and 60 of FIG. 1a. Generally, according to this aspect of the invention, sequences of typical distances are found, normalized and averaged, and the averages are compared with corresponding $\mu$-law (or A-law) distances in order to find a scaling factor. More specifically, for the $\mu$-law, it is known that if there is no attenuation or robbed bits, the distance between adjacent code values in a single sector will be $2^{n+1}$, where n is the sector level for $\mu$-law (n=0, 1, 2, ... 7). Where there are robbed bits, the typical distances can double. The values set forth in column two of Chart 2 below are "typical" distances. In addition, certain "atypical" distances are known; as the distance between adjacent levels which fall into different sectors will be the average of the distances between adjacent points in those sectors. These adjacent sector "atypical" distances are set forth in column four of Chart 2 below. It has been determined that depending on PAD attenuation and robbed bit configuration (i.e., RB before PAD, RB after PAD, and RB both before and after PAD), yet additional atypical distances will be provided. These atypical distances are seen in column one, three, five and six of Table 2 below:

TABLE 2

| 576 | 512 | 448 | 384 | 352 | 320 |
|-----|-----|-----|-----|-----|-----|
| 288 | 256 | 224 | 192 | 176 | 160 |
| 144 | 128 | 112 | 96  | 88  | 80  |
| 72  | 64  | 56  | 48  | 44  | 40  |
| 36  | 32  | 28  | 24  | 22  | 20  |
| 18  | 16  | 14  | 12  | 11  | 10  |
| 9   | 8   | 7   | 6   |     | 5   |
|     | 4   |     | 3   |     |     |
|     | 2   |     |     |     |     |

According to the invention, "typical" and "atypical" distances can be distinguished by the number of times they recur. Thus, without robbed-bit-signaling (or PADs), each "typical" distance might recur fourteen or fifteen times; while when robbed-bit-signaling is present, the same "typical" distance might recur seven times. Atypical distances, on the other hand, rarely recur at all.

According to the preferred embodiment of this aspect of the invention, the table of distances calculated at 20 (or 70) is utilized in finding typical distances, which in turn are utilized in finding scaling factors. In particular, for purposes of clarity, dL(i) is the notation utilized for the distance between two received probing signal levels L(i) and L(i−1); i.e., $$dL(i)=L(i)-L(i-1) \qquad (1)$$

According to the preferred embodiment of the invention, a sequence dL of the distances between the sixty-five largest probing signal levels are utilized (to provide sixty-four distances), and the first three non-zero components of the sequence (components M1, M2, M3) are found at 310 and are each subjected to the following steps. At 315, each of the distances in the sequence dL is compared to an upper bound $(1+\Delta)M_x$ and to a lower bound $(1-\Delta)M_x$, where $M_x$=M1, M2, M3, and $\Delta$ is a constant, to determine whether the distance falls within a desired range and can be said to be "equal" to the distance taken at 310. In this manner, a set (dL0) of distance differences within the range is found. In the presently preferred embodiment of the invention, the constant $0.05<\Delta<0.10$, with $\Delta$ most preferably equal to 0.07, which allows for changes in the distance due to noise (as opposed to PADs or robbed bits). At 320, the average (avdL0) of the set of distances found in the range is calculated:

$$avdL0=sum(dL0)/ndL0), \qquad (2)$$

where ndL0 is the number of distances in the set.

The average avdL0 calculated at 320 is utilized to find a second set (dL1) of distances within a second range. In particular, the components of dL1 are found at 325 by comparing twice the value of each of the distances in the sequence dL to an upper bound $(1+\Delta)$avdL0 and to a lower bound $(1-\Delta)$avdL0. At 330, the average (avdL1) of the second set of distances (dL1) is found according to $$avdL1=sum(dL1)/ndL1, \text{ if } ndL1>0,$$

$$\text{and } avdL1=dL0/2, \text{ if } ndL1=0. \qquad (3)$$

In other words, where distances are found which are approximately half of the average distance calculated with respect to dL0 (which will usually occur for typical distances because the distances between points in decreasing A-law or μ-law sectors decreases by a factor of two for each sector), the average of those distances are used to find the second average avdL1. Where there are no such distances (usually because the distance represents an atypical distance), the half value of dL0 is utilized.

The average avdL1 determined at 330 is used as the method of the invention continues at 335, where a third set (dL2) of distances within a third range is found by comparing twice the value of each of the distances in the sequence dL to an upper bound $(1+\Delta)$avdL1 and to a lower bound $(1-\Delta^*)$avdL1. At 340, the average (avdL2) of the third set of distances (dL2) is found according to $$avdL2=sum(dL2)/ndL2, \text{ if } ndL2>0,$$

$$\text{and } avdL2=dL1/2, \text{ if } ndL2=0. \qquad (4)$$

At steps 345 and 350, and 355 and 360, fourth and fifth sets of distances (dL3 and dL4) and average distances (avdL3 and avdL4) are found. As a result of steps 310 through 360, for each of M1, M2, and M3, two arrays are obtained; a first array (vdL) which sets forth the average values, and a second array (vndL) which sets forth the number of distances having the average value. More particularly:

$$vdL=[avdL0\ avdL1\ avdL2\ avdL3\ avdL4\ avdL5] \qquad (5)$$

$$vndL=[ndL0\ ndL1\ ndL2\ ndL3\ ndL4\ ndL5] \qquad (6)$$

According to the invention, the sums of the elements in arrays vndL are determined at 365 according to $$nM_x=sum(vndL). \qquad (7)$$

It should be noted that if the sum of the elements in an array vndL is greater than a first threshold (the first threshold preferably being set to ten), then the distance (M1, M2, or M3) relating to that array is considered a typical distance. Regardless, the largest of the $nM_x$ values (i.e., the max of nM1, nM2 and nM3) is found at 370 and used to find the component from which is scaling factor is to be calculated. In particular, the refined or average distances $avM_x$ for the $M_x$ having the largest $nM_x$ value is determined at 375 according to $$avM_x=(avdL0+2avdL2+4avdL3+8avdL3+16avdL4+32avdL5)/sum- (vndL) \qquad (8)$$

and the average final distance avDF is set to that value. While this determination could be utilized directly to establish a scaling factor, as the average final distance avDF should equal the distance utilized in the highest sector multiplied by a scaling factor, according to the preferred embodiment of the invention, three possible scaling factors are calculated at 380. The three scaling factors are Sc1=512/avDF, Sc2=256/avDF, and Sc3=128/avDF. As will be described hereinafter, each of the levels L(i) will be ultimately multiplied by a final scaling factor Scf which are chosen from the scaling factors Sc1, Sc2, and Sc3.

It should be appreciated that when there are fewer than five non-robbed-bit slots (as determined at step 30 of FIG. 1*a*), the non-robbed-bit slots are used in calculating a table of average distances at step 70 of FIG. 1*a*, and these are the distances utilized in the determination of a single set of three candidate scaling factors as described above with reference to FIG. 3. On the other hand, where there are five or six robbed-bit slots (as determined at step 30 of FIG. 1*a*), the algorithm set forth in FIG. 3 is utilized in conjunction with the distances for each slot (taken from step 20 of FIG. 1*a*)) in order to find three candidate scaling factors for each slot; i.e., three candidates for each of six scaling factors are determined.

Figure 4:
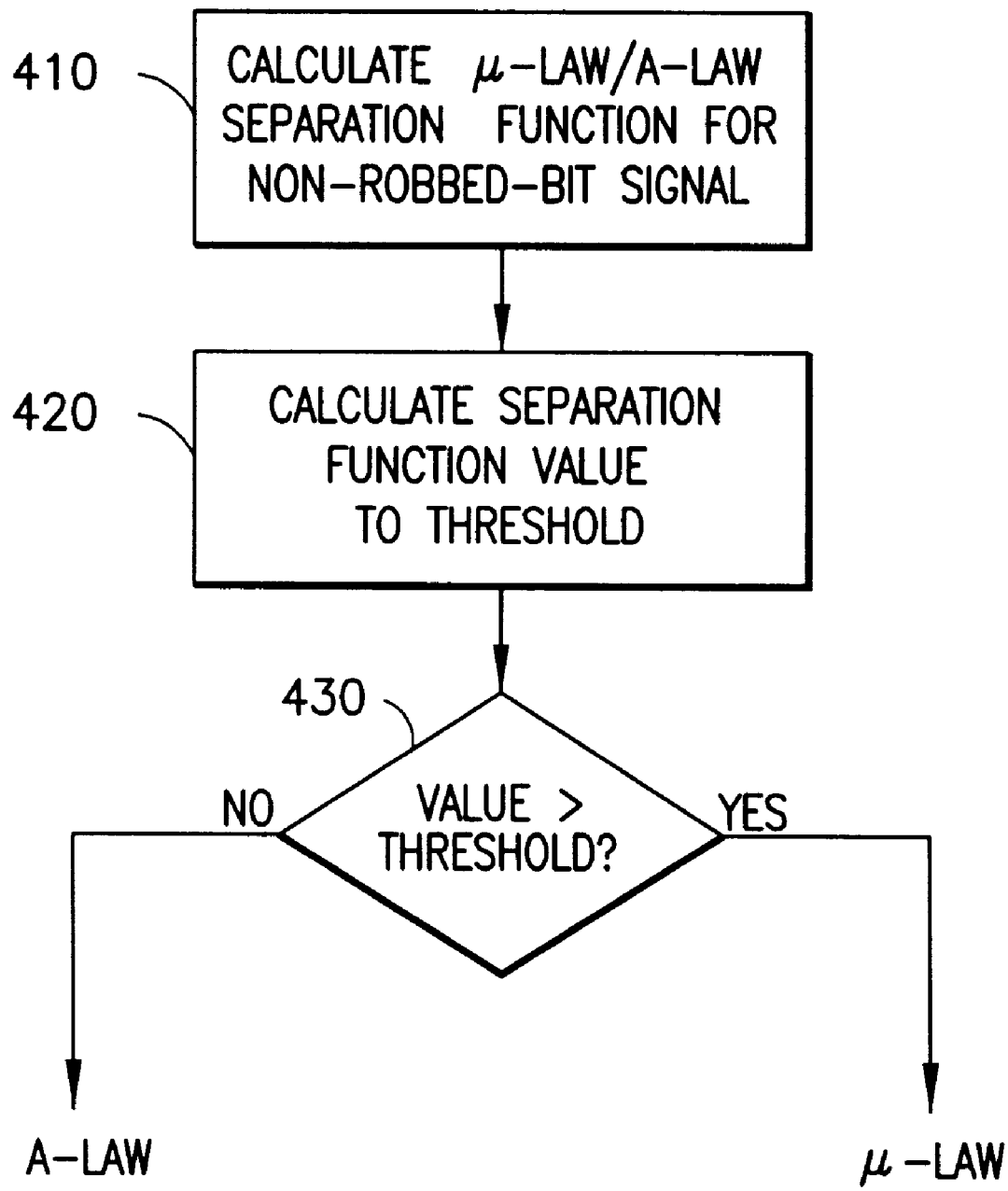
FIG. 4 is a flow chart of the method of distinguishing A-law and μ-law signals as required in FIG. 1$a$.
Figure 4A:
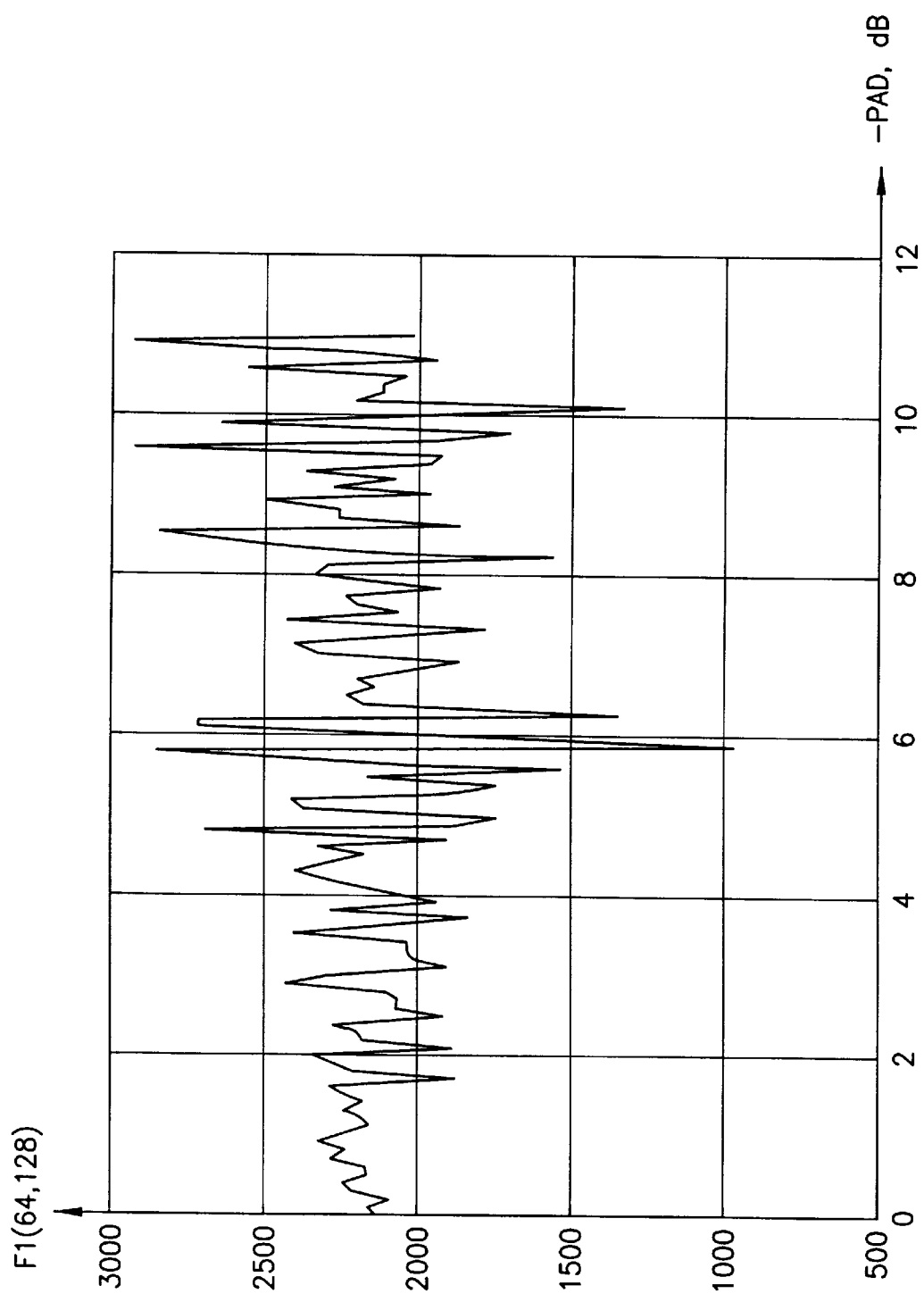

Turning now to FIG. 4, a flow chart of the preferred method of the invention for distinguishing A-law and μ-law signals is seen as required at steps 45 and 90 of FIG. 1*a*. An A-law/μ-law separation function F1(n1,n2) can be defined according to:

$$F1(n1, n2) = \sum_{i=n1}^{i=n2} \{L(i) - 2^y * [L(i-16y)]\} \qquad (9)$$

where y is a positive integer greater than zero and preferably equal to one. For A-law levels without noise (and with any PAD attenuation), for any $n2>n1 \geq 33$, F1(n1,n2) will be zero. On the other hand, for μ-law levels without noise and with 0 dB PAD attenuation, F1(n1,n2)=33(n2−n1+1). For example, the function F1(64,128) is plotted in FIG. 4*a* versus PAD attenuation. It is seen that the A-law/μ-law separation function F1(64,128) always exceeds one thousand at PAD attenuations ranging from 0 to 11 dB. Thus, according to the preferred embodiment of the invention, at 410, the value for the separation function F1(64,128) is calculated for any non-robbed-bit signal within the frame, or for the average of non-robbed-bit signals. Then, at 420, the value for the separation function is compared to a threshold (e.g., five hundred). If the value of the separation function exceeds the threshold at 430, the signal is determined to be a μ-law signal. Conversely, if the value of the separation function does not exceed the threshold, the signal is determined to be an A-law signal.

It should be noted that the presence of noise with zero-mean function F1(n1,n2) provides a non-biased estimation. Therefore, it is effective at any signal-to-noise ratio.

Figure 5:
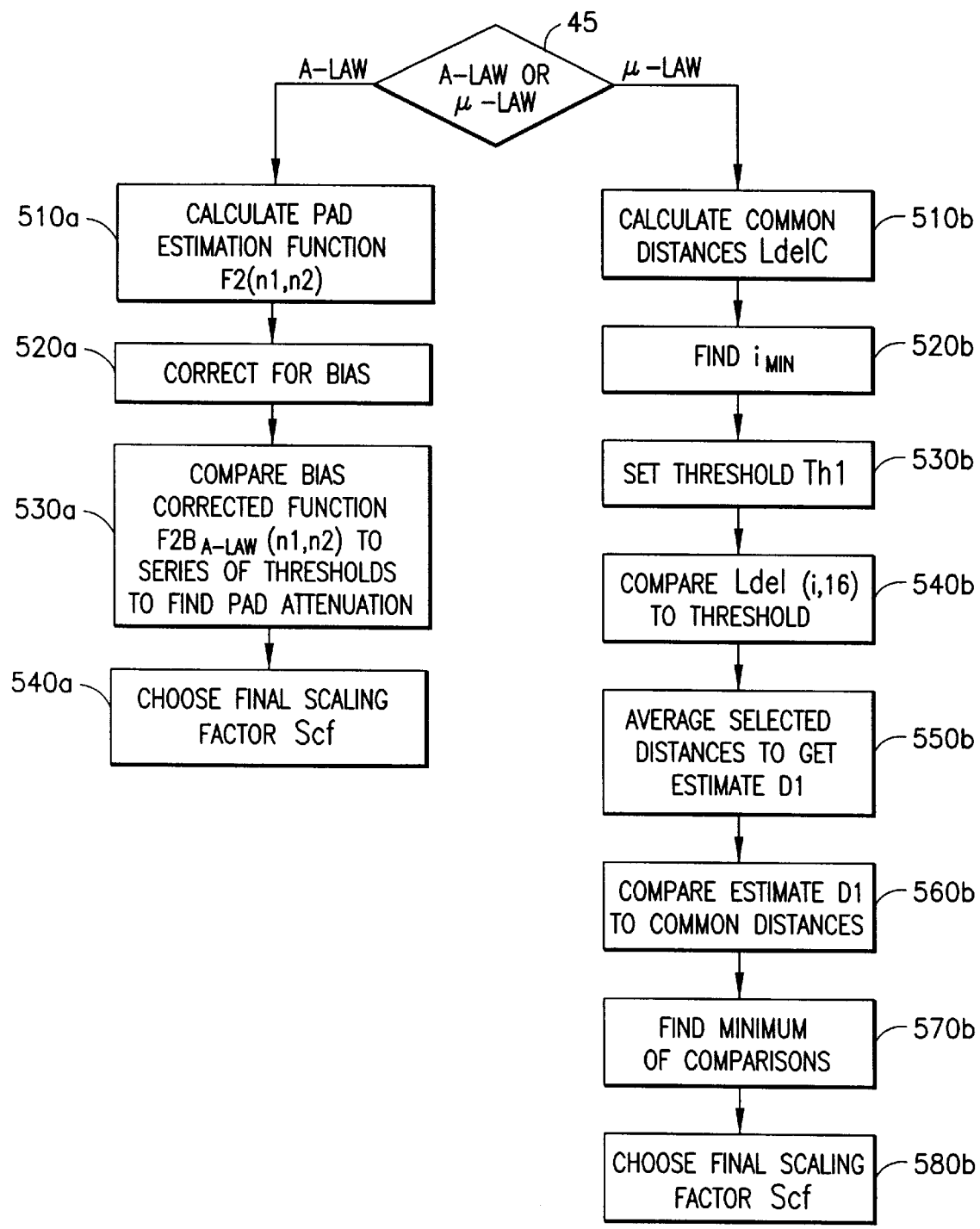

Prior to turning to FIG. 5, some background regarding PAD attenuation is helpful. As previously suggested, digital PAD attenuation is one of the most important impairments to which a V.90 type modem is subject; and according to the G.121 Recommendation, digital attenuation ranges from 0 dB to 10.5 dB depending upon geographical location. The most typical PAD attenuation possibilities in the United States are 0, 3 dB and 6 dB, and the most typical PAD attenuation in Europe is 7 dB. Some PAD attenuations are practically indistinguishable. For example, an A-law PCM signal digitally attenuated by 0 dB exactly coincides with a 6 dB digitally attenuated A-law PCM signal with 6 dB analog gain at 75% of all levels.

Figure 5A:
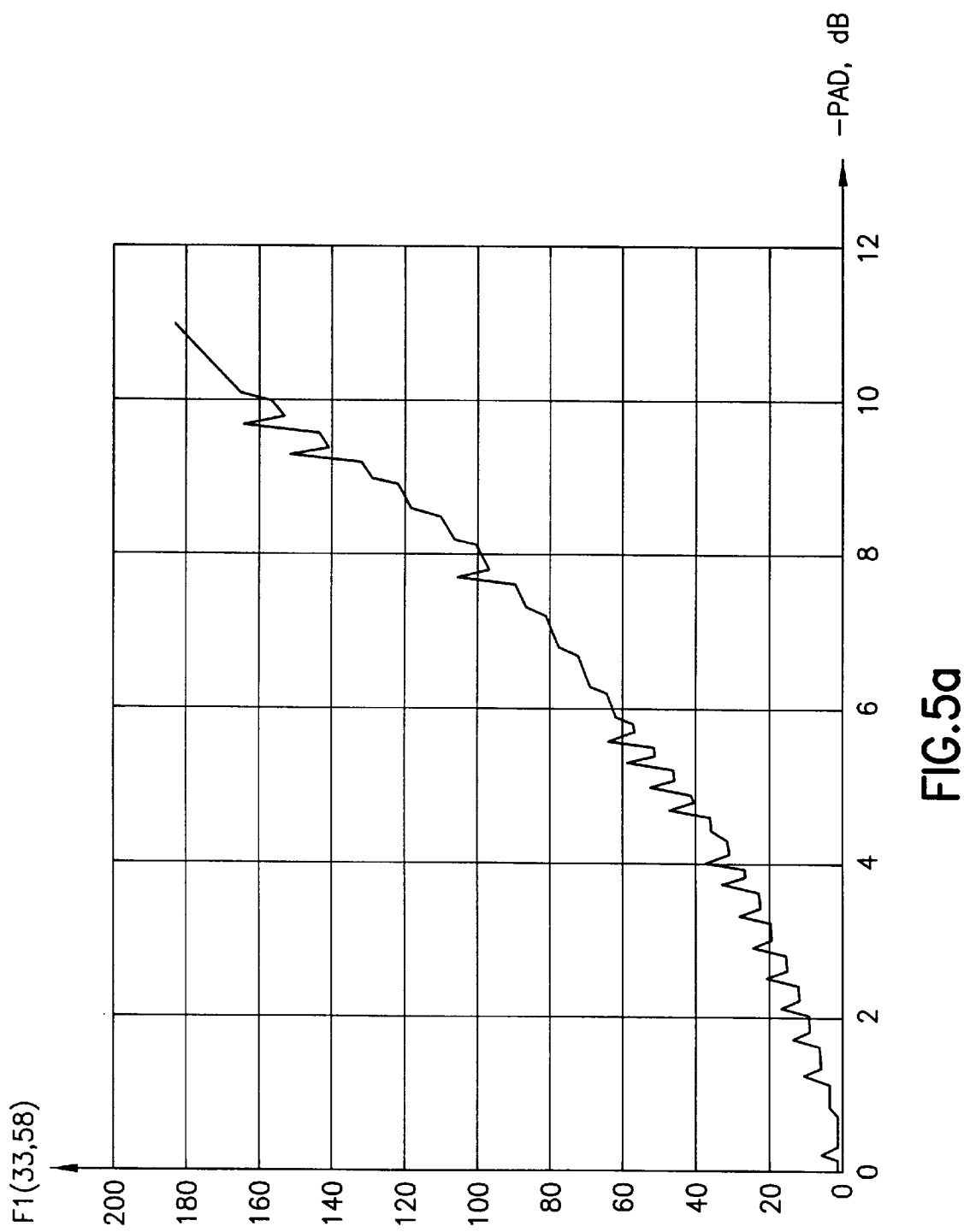
FIG. 5a is a graph of a PAD estimation function versus PAD attenuation for A-law signals without robbed bits.

Turning now to FIG. 5, a flow chart is seen of the method of estimating the digital PAD impairment as required at step 80 in FIG. 1a. Thus, with respect to A-law, at 510a, a pad estimation function F2(n1,n2) is calculated according to:

$$F2(n1, n2) = \sum_{i=n1}^{i=n2} \mathrm{abs}\{L(i) - 2^y * [L(i - 16y)]\} \quad (10)$$

where L(i) is the i-th positive level (i=1 . . . 128) received in a non-robbed-bit slot. If there is more than one non-robbed-bit slot (as determined at step 30 of FIG. 1a), the value L(i) may be an average value of the corresponding levels in the non-robbed-bit slots. In the preferred embodiment of the invention, at 510a, the pad estimation function is calculated for levels thirty-three and fifty-eight of A-law PCM signal PAD estimation. The function F2(33,58) versus PAD attenuation for A-law PCM signals is depicted in FIG. 5a.

It should be appreciated that the pad estimation function F2(n1,n2) in the presence of noise is a biased estimation. Therefore, a bias correction $B_{Alaw}$(SNR) should be utilized. In the preferred embodiment, $B_{Alaw}$(SNR) may be taken as zero for A-law PCM signals if the signal to noise ratio (SNR) is greater than 40 dB. If the SNR is less than 40 dB, the bias correction may be taken as 5(40−SNR(dB)). Thus, according to the preferred embodiment of the invention, and returning now to FIG. 5, a bias-corrected function $F2B_{Alaw}$(n1,n2) is obtained at 520a by subtracting the appropriate bias correction $B_{Alaw}$(SNR) from the determined function F2(n1,n2). Then, at 530a, the bias-corrected function $F2B_{Alaw}$(n1,n2) is compared to a series of thresholds for distinguishing, e.g., 0 dB and 6 dB, 1 dB and 7 dB, 3 dB and 9 dB, etc. In particular, A-law thresholds are utilized to determine the area of PAD attenuation for A-law PCM signals according to Table 3:

TABLE 3

| Area 1 | Area 2 | A-law threshold |
|---|---|---|
| 0 to 1 dB | 6 to 7 dB | 34 |
| 1 to 2 dB | 7 to 8 dB | 48 |
| 2 to 3 dB | 8 to 9 dB | 63 |
| 3 to 4 dB | 9 to 10 dB | 84 |
| 4 to 5 dB | 10 to 11 dB | 106 |

If the threshold is exceeded, the PAD is determined to reside in "area 2"; whereas if the threshold is not exceeded, the PAD is determined to reside in "area 1". Using the determination made at 530a as to the PAD attenuation (and the previous determinations of scaling factor candidates at 35 or 60 of FIG. 1a—also see step 380 of FIG. 3), the final scaling factor Scf is chosen at 540a according to:

if Sc1<1.1 and PAD<6 dB, then Scf=Sc1 if Sc1<1.1 and PAD≧6 dB, then Scf=Sc2 if Sc1>1.1 and PAD<6 dB, then Scf=Sc2 if Sc1>1.1 and PAD≧6 dB, then Scf=Sc3. (11)

Figure 5B:
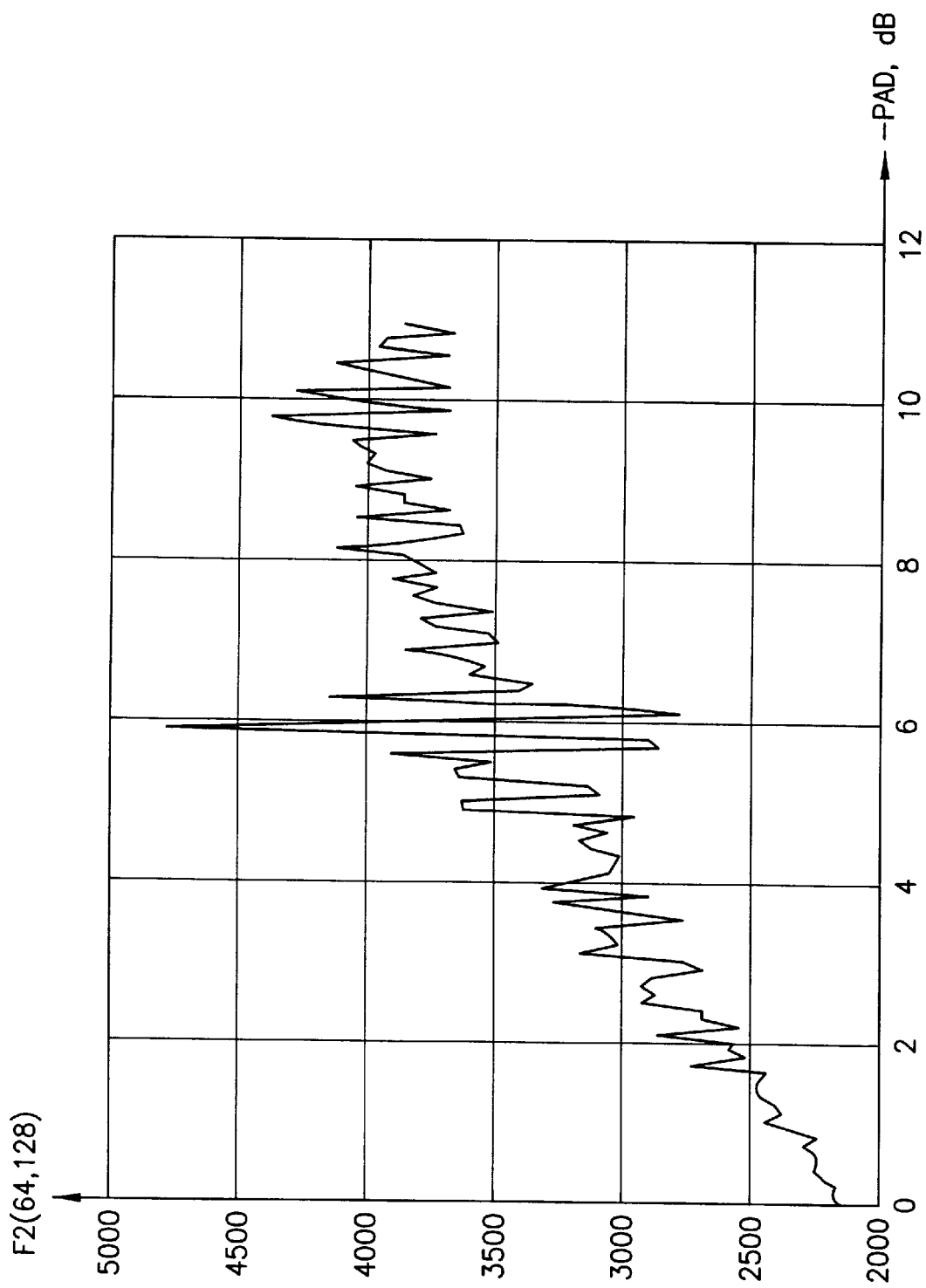
FIG. 5b is a graph of a PAD estimation function versus PAD attenuation for $\mu$-law signals.

According to the invention, when the channel is primarily linear in nature, the PAD estimation and final scaling factor determinations for μ-law signals, may be accomplished in a manner similar to that for A-law signals. Briefly stated, in such a situation, F2(64,128) is calculated. As seen in FIG. 5b where F2(64, 128) is shown plotted against PAD attenuation, the pad estimation function F2(64,128) is not monotonic and does not allow exact PAD estimation. However, it does permit distinction between attenuations which differ by 6 dB. In the linear channel situation, the bias correction $B_\mu$ may be taken as 0 when SNR>40 dB, and may be taken as 15(40−SNR(dB)) if the SNR≦40 dB. Further, the following μ-law thresholds are established for $F2B_\mu$ to distinguish the following areas as set forth in Table 4:

TABLE 4

| Area 1 | Area 2 | μ-law threshold |
|---|---|---|
| 0 to 0.15 dB | 6 to 6.15 dB | 2480 |
| 0.15 to 1 dB | 6.15 to 7 dB | 2779 |
| 1 to 2 dB | 7 to 8 dB | 3136 |
| 2 to 3 dB | 8 to 9 dB | 3286 |
| 3 to 4 dB | 9 to 10 dB | 3526 |
| 4 to 5 dB | 10 to 11 dB | 3448 |

Based on the PAD determination, an appropriate final scaling factor is chosen from the candidates.

According to the presently preferred embodiment of the invention, the determination of the final scaling factor for μ-law signals is preferably conducted according to steps 510b, 520b, . . . , of FIG. 5 which apply to both linear and nonlinear channels (as opposed to only linear channels). In a channel with nonlinear distortion, according to the preferred embodiment, the highest levels of the DIL sequence are not utilized in making scaling factor and PAD area estimations because these highest levels are significantly disturbed. Thus, according to the preferred embodiment, the highest level utilized in finding the PAD attenuation and final scaling factor is level number ninety-six. In addition, function F2(n1,n2) which was used for distinguishing PAD area in the A-law situation (and can be used in linear μ-law situations) can give wrong results where μ-law is used in a nonlinear channel. Therefore, other mechanisms for determining PAD attenuation and a final scaling factor are provided.

In order to find the PAD attenuation and final scaling factor in a nonlinear channel, it is desirable to define a distance function Ldel(i,Δ) according to:

$$Ldel(i,\Delta) = L(i) - 2L(i-\Delta) \quad (12)$$

where L(i) is the value of the i-th level of the scaled DIL sequence at the output of the equalizer, and Δ is the given shift between the compared indexes (i.e., the difference of the level numbers). Thus, for example, Ldel(48,16)=L(48)–2L(32). Among the distances calculated according to the distance function of equation (12) will be commonly recurring distances (designated LdelC), and other distances. The commonly recurring distances have been found to be strongly connected with PAD attenuation and a desired scaling factor Scf according to:

$$LdelC = 33 \cdot (10^{PAD/20}) = 33/Scf \quad (13)$$

Thus, if the PAD attenuation is zero, LdelC will be thirty-three. If the PAD attenuation has a value of three, the common distance LdelC will be approximately forty-seven, while if the PAD attenuation has a value of six, the common distance LdelC will be approximately sixty-six, etc. In addition, for a perfect DIL sequence and Δ=16, it can be shown that $$LdelC = \max_i(Ldel(i,16)) \quad (14)$$

In other words, the common distance will be equal to the maximum distance for all indices i. The minimum index i which provides for Ldel(i,Δ)=LdelC and which is designated $i_{min}$ is a function of the PAD attenuation and Δ. Thus, for Δ=16, the following has been found:

TABLE 5

| PAD dB | 0 | 3 | 6 | 9 | 12 |
|---|---|---|---|---|---|
| $i_{min}$ | 18 | 41 | 80 | 89 | 95 |

It has also been found as a rule, if Ldel(i,16)≠LdelC, then Ldel(i,17)=LdelC; but if Ldel(i,17)≠LdelC, then Ldel(i,18)=LdelC.

Based on the above properties, at 510b, expected common distances LdelC are calculated according to:

$$LdelC1 = 33/Sc1; \; LdelC2 = 66/Sc1; \; LdelC3 = 132/Sc1 \quad (15)$$

where Sc1 is the largest of the three candidate scaling factors determined at step 380 of FIG. 3, 1≤Sc1≤2, scaling factor Sc2=(Sc1)/2 and scaling factor Sc3=(Sc1)/4. At 520b, the index $i_{min}$ is calculated in order to select and accumulate Ldel(i,Δ). Typically, the index $i_{min}$ can be found between index level 79 and index level 95 where the PAD attenuation is between 6 dB and 12 dB. The index $i_{min}$ can be approximated according to:

$$i_{min} = floor(63 + 2.7(PADmax)) \quad (16)$$

where $$PADmax = 20\log10((Sc1)/4) \quad (17)$$

In order to avoid accumulating distance values for Ldel(i,Δ) which are too low, at step 530b, a threshold value is selected which is a monotonically increasing function of the expected PADmax. A reasonable threshold Th1 is set according to:

$$Th1 = ceiling((1.76 \cdot i_{min}) - 113) \quad (18)$$

At step 540b, for i from $i = i_{min}$ to $i = (i_{min} + N_i)$, distances Ldel(i,16) are compared to the threshold Th1, and those exceeding the threshold are selected and averaged at 550b. The average value is taken as an LdelC estimate which is denoted D1:

$$D1 = \sum_{i_{min}}^{i_{min}+N_i} (Ldel(i,16) > Th1)/N_{sell} \quad (19)$$

where $N_{sell}$ is the number of elements selected at 540b as exceeding the threshold Th1. If $N_{sell}$ is less than some desired minimum number $N_{sel-min}$, $N_i$ can be decreased so that additional elements may be selected until $N_{sell} = N_{sel-min}$. Reasonable values for $N_i$ and $N_{sel-min}$ are $N_i = 6 \ldots 10$, and $N_{sel-min} = 2$, although a higher value for $N_{sel-min}$ such as 5 is preferred.

If desired, instead of setting Δ=16 at steps 540b and 550b, the Δ may be ranged from Δ=16 to Δ=Δmax. Thus, for $i = i_{min}$ to $i = (i_{min} + N_i)$ and Δ=16 to Δ=Δmax, distances Ldel(i,Δ) are compared to the threshold Th1, with a minimum Δ denoted Ldel(i,$\Delta_{min}$)_Th1. The mean of taken values m(Ldel(i,$\Delta_{min}$)_Th1) can then be calculated, and among the values (Ldel(i,$\Delta_{min}$)_Th1) those which satisfy the following inequality are selected:

$$Ldel(i,\Delta_{min})\_Th1 < (1+\epsilon) \cdot m(Ldel(i,\Delta_{min})\_Th1) \quad (20)$$

where reasonable $\epsilon = 0.1 \ldots 0.3$. Having averaged the selected values, the LdelC estimate is found and designated D1.

Regardless of how D1 is found, at 560b, differences $d_k$ are calculated according to:

$$d_k = |(D1 - LdelC_k)| \text{ for } k=1, 2, 3 \quad (21)$$

and at 570b, the index $k=k_m$ is found for the minimum $d_k$. At 580b, the final scaling factor Scf is set according to Scf=$Sck_m$.

Figure 6:
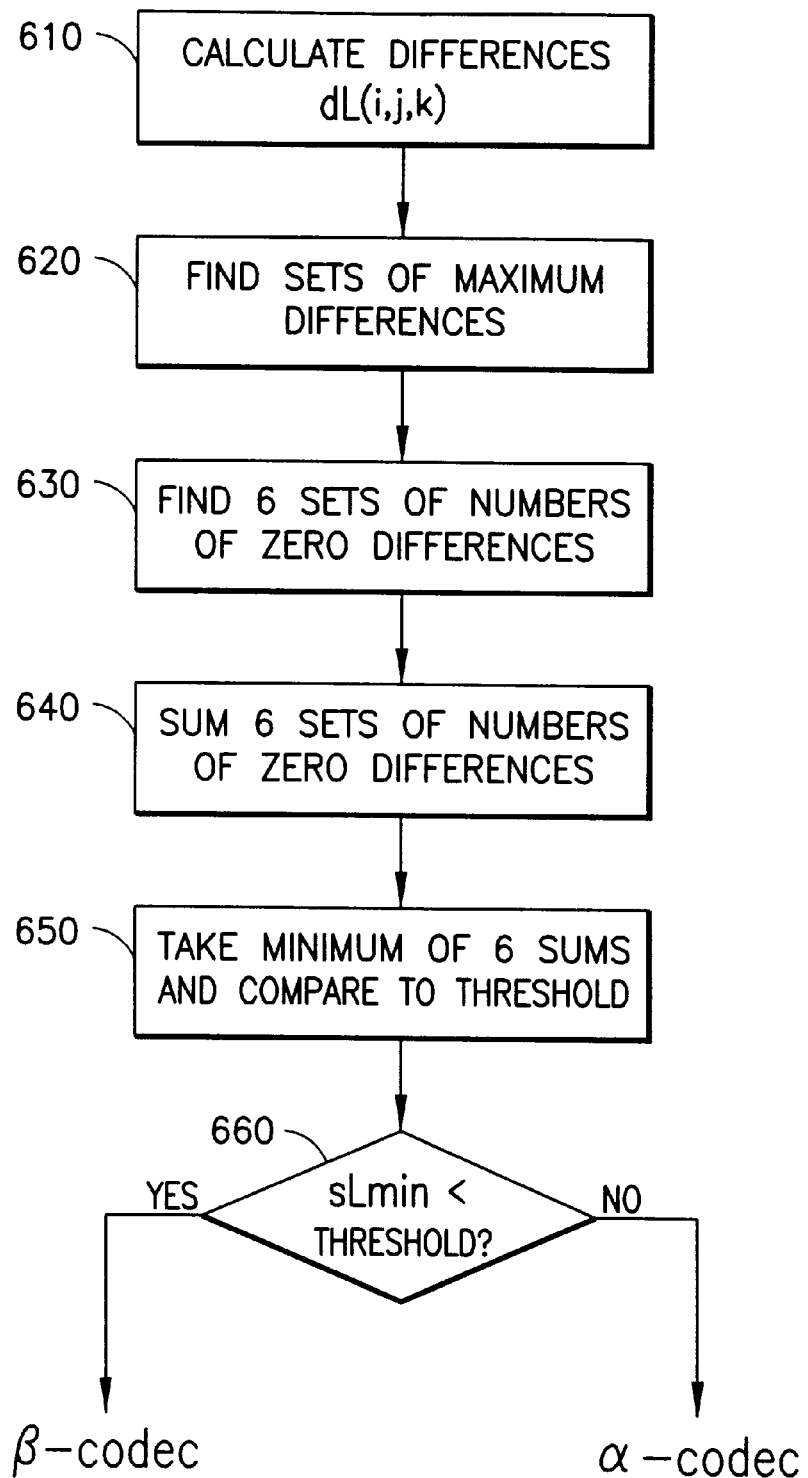

Before turning to FIG. 6, and according to another aspect of the invention, channel nonlinearity may be evaluated by comparing the average common distance D1 calculated according to equation (19) to average common distance D2 which relate to a different index range. More particularly, D2 is generated in the same way as D1 as described above, except using data from the highest levels (indices greater than ninety-two); i.e., from $i = (i_{max} - N_i)$ to $i = i_{max}$, where $i_{max}$ corresponds to the maximum level of the transmitted DIL sequence. An indication of nonlinearity can then be defined as an absolute difference between D2 and D1:

$$NL = |D2 - D1| \quad (22)$$

A reasonable threshold can be set to define the channel as nonlinear or linear. In addition, a quantitative estimate of nonlinearity in decibels $dB_{NL}$ can be generated such as:

$$dB_{NL} = (45 + 20\log10(250/d)) \quad (23)$$

where $$d = NL \cdot 10^{0.075 dBPAD}. \quad (24)$$

In addition, $dB_{NL}$ can be estimated without a calculation of D1 according by substituting the following function for NL in equation (24):

$$NL = |D2 - (33 \cdot 10^{(dBPAD/20)})| \quad (25)$$

Equation (23) provides a particularly good estimate for nonlinearity which exceeds 60 dB.

The determination of nonlinearity can be used, if desired, for translation table design. For example, if NL is large, a scaled DIL sequence may be substituted for the regular translation table.

Turning now to FIG. 6, a flow chart is seen of the method of distinguishing robbed-bit signaling (α-codec type) from half-robbed-bit signaling (β-codec type) as required at steps 55 and 97 of FIG. 1a. According to the preferred embodiment of the invention, the existence of a half-robbed-bit slot is generally determined by comparing the levels of received signals for each of the slots, finding the number of zero distances (or conversely, the number of non-zero distances) between corresponding values in the different slots, and comparing the number of zeros distances (or non-zero distances) to a threshold. According to the invention, where a particular slot shows hardly any zero differences between its levels received and the levels received by other slots (i.e., its number of zero-distance differences is below the threshold; or its number of non-zero-distance differences is above another threshold), that slot is declared to be a half-robbed-bit slot. In fact, ideally, the number of zero-difference distances between a non-robbed-bit and a half-robbed-bit slot will be zero; the number of zero-difference distances between a non-robbed-bit and another non-robbed-bit slot will be equal to the number of levels checked (i.e., all comparisons will result in a zero difference); and the number of zero-difference differences between a non-robbed-bit slot and a robbed-bit slot will be up to sixty-four (for one hundred twenty-eight levels).

More specifically, as seen in FIG. 6, at step 610, using either the tables of levels generated at step 15 or step 75 of FIG. 1a, sets of differences dL(i,j,k) are calculated between received levels L(i,j) and L(i,k) of different slots, where "i" is the level number, and "j" and "k" are slot numbers. In the preferred embodiment, the i=70, 71, . . . 128 in order to reduce the effect of noise on the determinations. Utilizing matrices, at step 620, six sets of six maximum distances are found $(max_i(dL(i,j,k)) = dLmax(j,k))$ for j=1, 2, . . . 6, and k=1, 2, . . . 6. At 630, zero differences between each slot j and each slot k are found and tallied, with a "zero difference" preferably being defined as being below a certain threshold. According to the preferred embodiment of the invention, the threshold is a function of the maximum distances; i.e., dthr(l,k)=dLmax(l,k)/20). At 640, up to six sums of numbers of zero distances are found, with $$sL1 = \sum_{k=1}^{6} N(1,k), sL2 = \sum_{k=1}^{6} N(2,k), \ldots, sL6 = \sum_{k=1}^{6} N(6,k). \quad (26)$$

The minimum sLmin of sL1, sL2, . . . , sL6 is taken at 650 and compared to a threshold which is a function of the number of robbed-bit slots and the number of levels compared. If sLmin is less than the threshold, as seen at 660 the slot corresponding to sLmin is a half-robbed-bit slot; otherwise, the slot utilizes α-codec type signaling.

Figure 7:
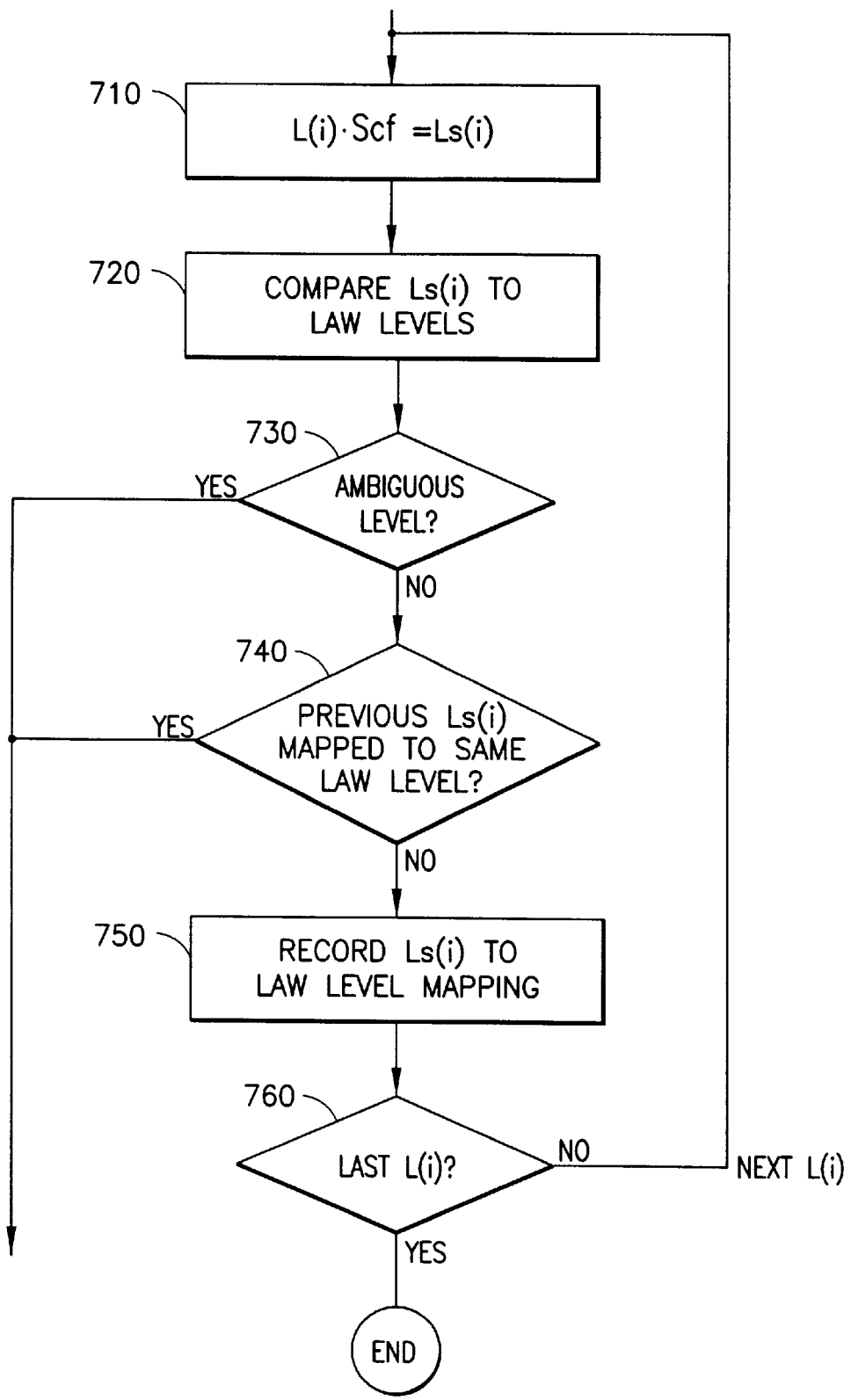

FIG. 7 is a flow chart of the method of generating translation tables using information previously determined from the methods described with reference to FIGS. 4–6 as required at steps 100a or 100b in FIG. 1a. In particular, in generating translation tables, information regarding whether A-law or μ-law is being utilized (FIG. 4), whether α-codec type or β-codec type robbed bit signaling is being utilized (FIG. 6), and scaling factor determinations (FIG. 5) is required. Thus, according to FIG. 7, at 710, for each slot, each level of the received probing signal L(i) is multiplied by the final scaling factor Scf for that slot (FIG. 5) to provide a scaled level (Ls(i)). As seen in FIG. 1a, the levels L(i) are obtained from either the tables of levels 15 in the case of five or more robbed bit slots, or from the substitute tables of levels 75 in the case of less than five robbed bit slots. Then, at 720, the scaled levels Ls(i) for that slot are compared to the standard values of its appropriate slot-type (A-law, μ-law α-codec, or μ-law β-codec). If the scaled level is within a predetermined percent (e.g., 5%) on either side of a midpoint between adjacent standard values, at 730, that point is discarded (or declared unavailable for use in the constellation). Likewise, as indicated at 740, if more than one scaled level Ls(i) maps to a single standard value, only one of the scaled levels may be utilized in the constellation, and the other(s) should be declared unavailable or discarded. Otherwise, the closest standard level is recorded as usable at 750. As indicated at 760, steps 710–750 are preferably conducted on all levels L(i) of the received probing signal.

Figures 2, 8B:
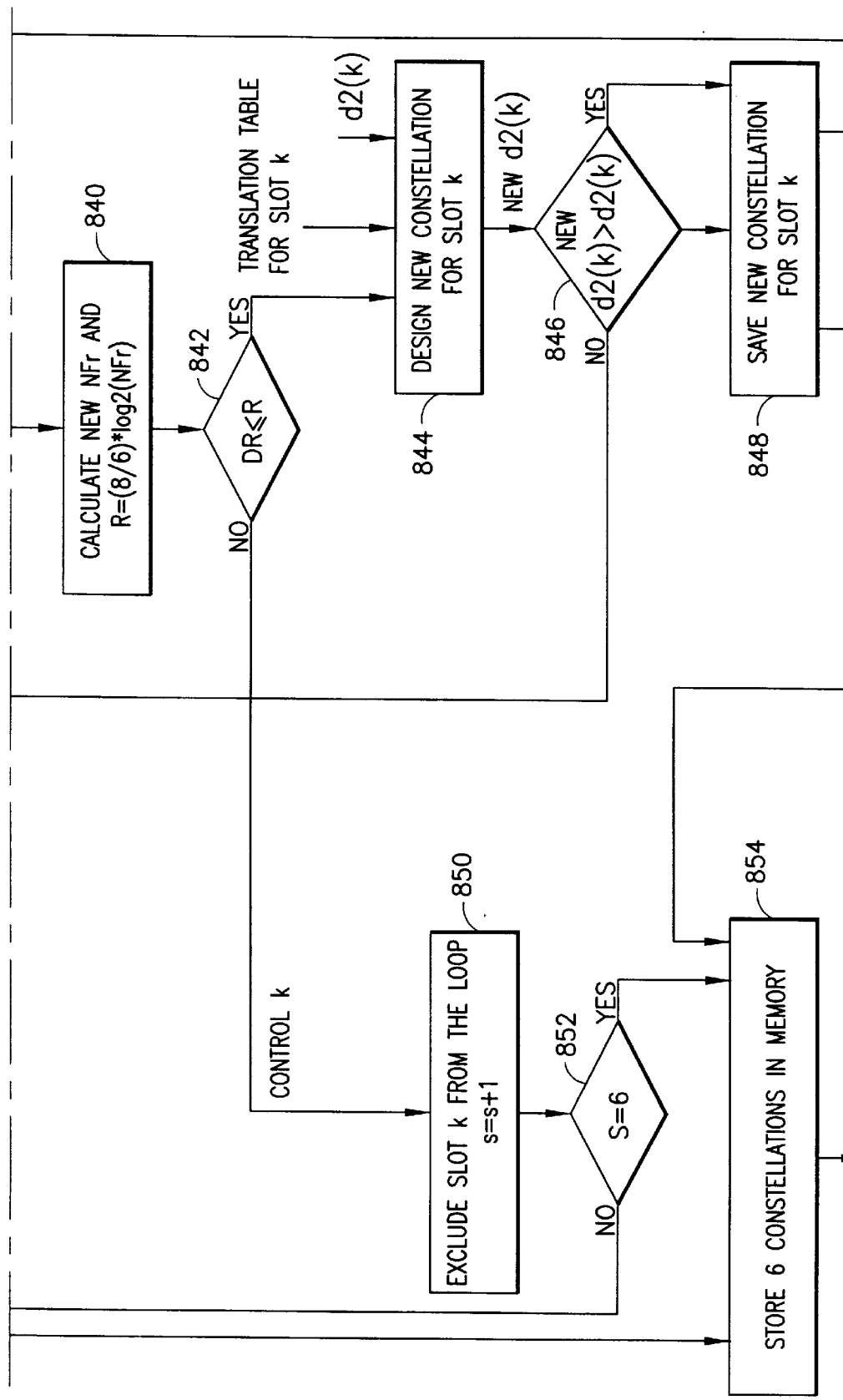
Figure 8C:
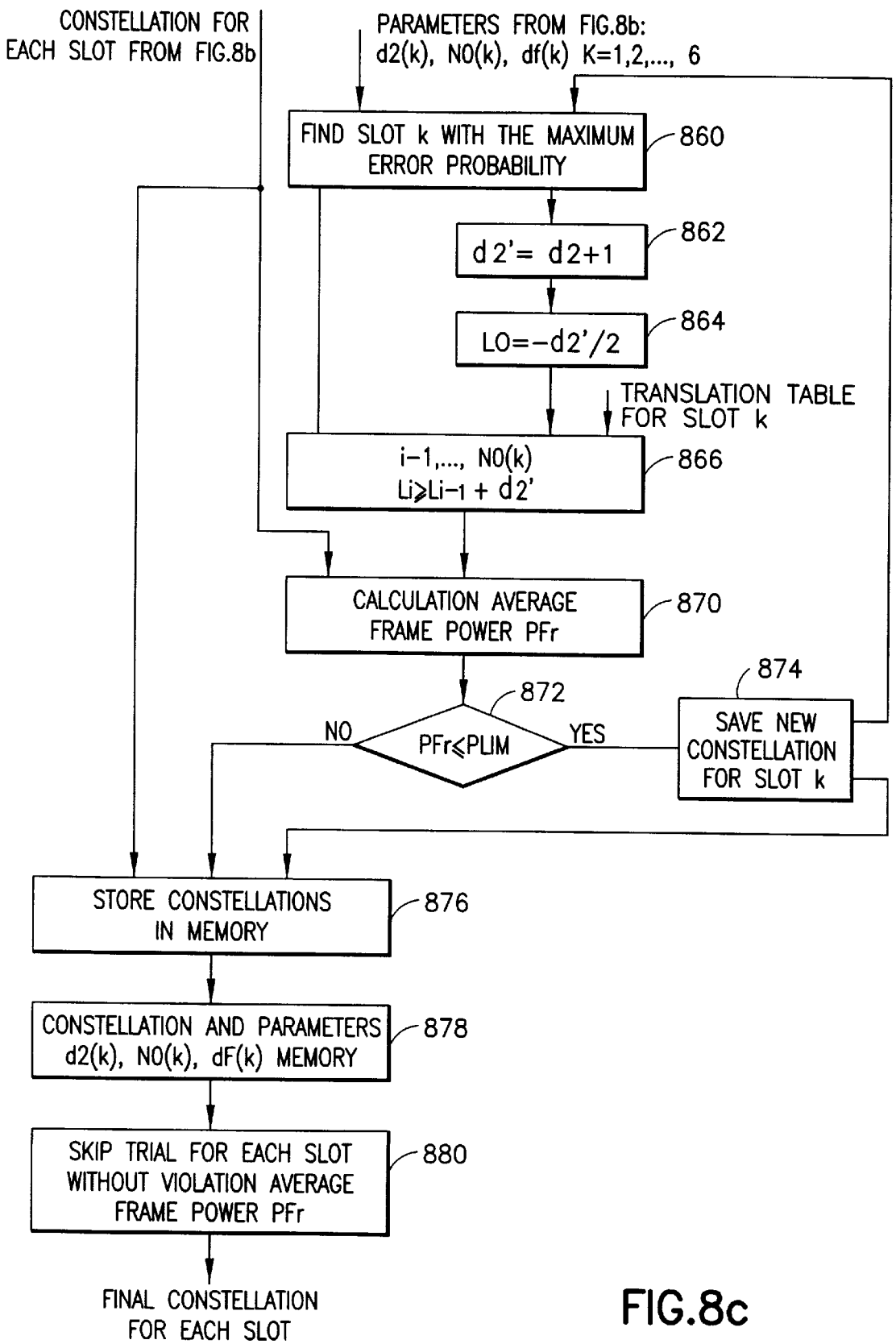

In accord with another aspect of the invention, and as seen in more detail with reference to FIGS. 8a–8c, the translation tables generated at steps 100a and 100b of FIG. 1a are utilized in conjunction with the power limit P for the channels, as well as the minimum distance d0 in order to optimize the constellation(s) which are generated by the modem receiver. It will be recognized by those skilled in the art that the minimum distance d0 is a function of the signal to noise ratio (SNR) of the channel, and the permissible error. In other words, d0 is the minimum distance between symbols which can provide a performance with the probability of error (Per) equal to a predetermined value with a given signal to noise ratio. While different formulae are known for finding the minimum distance, according to the preferred embodiment of the invention, the following relationship is utilized, as set forth in Okunev, Yuri B. "Phase and Phase-Difference Modulation in Digital Communication", Artech House, p.264, 1997:

$$Per = 0.65 \cdot exp(-0.443 \cdot (d/(2 \cdot \sqrt{D(n)} + 0.7)) \quad (27)$$

where D(n)=Ps/SNR, and Ps is the average signal power. Typical examples of Per include $10^{-4}$, $10^{-5}$, $10^{-6}$, . . .

Turning now to FIG. 8a, a preliminary constellation is generated on a per-slot basis. Thus, on a per-slot basis, an initialization level L0 for a constellation is generated at step 802 by setting the L0 equal to −d/2, where d is initially set to the minimum distance d0. At step 804, a first (and subsequent) level value (Li=L1) from the translation table for that slot is chosen for the constellation by picking a level value equal to or just exceeding Li−1 (L0) plus d0. In other words, the closest level value in the translation table which exceeds d0/2 will be taken as the first point of the constellation, thereby ensuring that the distance between that point and its negative will be at least the minimum distance d required to meet performance requirements. At 806, the level value is placed in the "current" constellation memory for that slot, and at 808, the average power of all points (initially only one point) in the "current" constellation memory is compared to a power limit Plim. If the average power of all points in the current constellation memory is less than the power limit, the index i is incremented at 810, and the method continues at 804 with another level value being chosen from the translation table. As level values Li are chosen and added to the current constellation memory at 806, the "previous" constellation is also stored at 806 in case the average power of the points in the current constellation exceed the power limit as determined at 808. If the average power of the points in the current constellation exceeds the power limitation, then the "previous" constellation is stored as a preliminary constellation at 812. In addition, the number of non-negative levels (points) N0 in the constellation is stored (which is equal to the final or maximum index i), as is the minimum distance d1 between points chosen for the constellation.

While steps 802–812 provide a first "cut" at generating a constellation, steps 814–824 improve the constellation by attempting to increase the distance between the chosen points. Thus, at step 814, the initial distance d between points is set to the minimum distance d1 found at step 812, and an initialization level L0 is set at −d/2 (where d=minimum distance d1). At 816, N0 level values from the translation table for that slot are chosen for the constellation by sequentially picking level values according to Li≧Li−1+d1, with each higher level chosen incremented by at least d1 over the previous level. The first constellation is stored at 818, and the average power of the constellation points are compared to the power limitation at 820. If the power is less than the power limit, at 822, the minimum distance (d=d1) is incremented (d=d+1), and steps 814–820 are repeated. In this manner, a new constellation is generated at 816 with a larger minimum distance between levels then the previous constellation. If the new constellation meets power limitations at 820, the minimum distance is incremented again at step 822, and steps 814–820 are repeated, etc. However, if the new constellation does not meet power limitations, the "previous" constellation generated at 818 is provided as the new constellation at 824, and the minimum distance (denoted d2), the number of levels (points) (N0) in the constellation, and the number of levels (df) which are separated by only the minimum distance d2 are also noted at 824 for each slot j. It will be appreciated that information regarding six constellations is generated in this manner, with each constellation being optimized for the number of points and the minimum distance in the constellation.

According to another aspect of the invention, the constellation generated according to FIG. 8a may be further optimized as set forth in FIG. 8b by minimizing the number of points N0 per slot without decreasing the data rate. In particular, at 830, two values Rmax, and Rreal are determined or provided. Rmax is the maximum potentially achievable data rate given the number of points which are in each of the six constellations:

$$R\max = Fs \cdot (1/6)\log_2\left(64\prod_{j=1}^{6} N0(k)\right) \quad (28)$$

where Fs is the sampling rate=8 kbps, N0(k) is the number of non-negative points in the constellation of slot k, and the term in the second set of parenthesis is also called NFr. Rreal is defined as the set of data rates permitted by the V.90 standard; i.e., Rreal=(28+a(8/6))1000; a=0, 1, . . . 21).

At step 832, a data rate DR is found which is the maximum Rreal which is less than or equal to Rmax. Thus, if the data rate DR equals Rmax as determined at step 834, the constellations generated at 824 are taken as the final constellations at 854. On the other hand, if the data rate DR is less than Rmax, at 836, the slot with the maximum error probability is located. The determination of maximum error probability can be made in many manners. However, according to the preferred embodiment of the invention, the slot having the smallest minimum distance d2 is considered the slot with the maximum error probability. Where more than one slot have identical minimum distances, the slot having the most points separated by that minimum distance (i.e., the largest df) is chosen as the slot of maximum error probability.

At step 838, the number of points in the constellation for the slot having the maximum error probability is reduced; i.e., N0(k)=N0(k)−1. Then, at 840, a revised NFr and revised Rmax are calculated according to equation (28), and at 842, the revised Rmax is compared to the data rate originally calculated at 832. If the Rmax calculated at 840 is less than the data rate calculated at 832, at step 844, a new constellation with N0 reduced by one is generated for the slot according to steps 814–824. The minimum distance d2 of the resulting constellation for that slot is then compared at 846 to the minimum distance of the constellation for that slot before the number of points in the constellation was reduced. If the new d2 is greater than the old d2, the new constellation with fewer points is saved at 848 and used to overwrite the constellation stored at 854; and the method returns to step 836 to find the slot (i.e., the same or another) that now has the maximum error probability, and to step through steps 838 et seq. Thus, as a result of steps 830–848, the number of points in the slot having the maximum error probability is reduced. The result of this reduction is that additional distance is obtained between points in the constellation (and hence lower error rates) without affecting the data rate.

Returning to step 846, if in carrying out the method of the invention, the new minimum distance d2 obtained as a result of reducing the number of points in the constellation and regenerating the constellation is no different than the old minimum distance, then the method returns to step 838 where the number of points in the constellation of the particular slot is further reduced. The method continues with steps 840 et seq. Also, if at step 842, the Rmax calculated as a result of decreasing the number of points of a particular slot decreases below the data rate calculated at step 832, the method continues at step 850. At step 850 the slot having the maximum error probability is excluded from the loop, as reduction of the number of points in its constellation will affect the data rate. If the loop has not been traversed for all slots, then at step 852, the method continues by returning to step 836 where the slot having the next highest error probability is found (i.e., the slot other than the previously excluded slot(s) having maximum error probability). The method continues until each slot has been tested to see whether the number of points in its constellation can be reduced without reducing the overall data rate. The resulting constellations stored at step 854 are then utilized in the preferred method shown in FIG. 8c.

Turning now to FIG. 8c, and in accord with another aspect of the invention, a further optimization to increase reliability without reducing the data rate is carried out by permitting the power of a slot to exceed power limitations, provided the average power of the frame over the six slots is not exceeded. Thus, utilizing the minimum distances (d2) of the constellations obtained from step 854 of FIG. 8b, and if necessary, the number of points (df) separated by that minimum distance in each slot, the slot having the maximum error probability is found at 860. At 862, the minimum distance d2 is increased by one (thereby violating the power limitation for that slot). Using an initialization at step 864, the translation table for that slot resulting from step 740 of FIG. 7, and the number of points for that slot (N0(k)) as finally determined according to the method of FIG. 8b, a revised constellation for the slot of maximum error probability is determined at 866 substantially as described above with reference to step 816 of FIG. 8a. With the revised constellation, (and using information regarding the remainder of the constellations) the average power of the entire frame PFr is calculated at 870 and compared at 872 to the permissible power for the frame (Plim–fr); preferably as discussed below with reference to FIG. 9. If the permissible power for the frame is not exceeded, then the revised constellation is saved at 874 and used to overwrite the constellation for that slot at 876; and the method continues at 860 where the slot (the same or another) now having the maximum error probability is found. The method continues with steps 862 et seq. as previously described until, at step 872 the revised constellation is found to cause the average power of the entire frame to exceed the permissible power for the frame. When the average permissible power of the frame is exceeded, the method continues at 876 where no (further) change is made to the constellation. Alternatively, if desired, the investigated slot can be excluded from a loop (such as described above with reference to FIG. 8b), such that the slot with the next maximum error is found at 860 and subjected to steps 862 et seq. Regardless, eventually the constellations stored at step 876 are reviewed at 878 for each slot in order to find the minimum distance d2, the number of points N0 (which can be taken from FIG. 8b), and the number of points located a minimum distance from another point df for the slot. Then, at 880, a "skip trial" is conducted for each slot in a well-known manner, in order to try to reduce the number of points in the constellation for that slot having a minimum distance (i.e., reduce df) by moving the constellation points without violating the average frame power limitations. In the skip trial, an attempt is made to increase the power of the first level (which will result in the power of at least one subsequent level being increased) without violating average frame power limitations. As a result of the skip trial, while the minimum distances of each of the constellations will remain the same, the error probability of one or more constellations can be improved if constellation points can be moved.

It has been found by the inventors that the optimization methods set forth with respect to FIGS. 8a–8c are helpful in significantly increasing reliability by reducing bit error rate, often by a factor on the order of one hundred. It should be appreciated by those skilled in the art, however, that various of the techniques set forth in FIGS. 8a–8c can be used to optimize the data rate while maintaining a given bit error rate, instead of optimizing the constellations for minimum distance and hence bit error rate while maintaining a data rate. For example, instead of finding the slot with the maximum error probability and decreasing the number of points in order to increase distance without affecting the data rate as described in FIG. 8b, the slot having the minimum error probability can be found, and the number of points in the constellation for that slot can be increased provided that increase will cause the data rate to be increased, and the total frame power limitations will not be exceeded. In addition to "borrowing" power from other slots in order to avoid total frame power limitations, or in lieu thereof, it may be possible to decrease the minimum distance of the slot having the minimum error probability to which the constellation point was added in order to ensure that the total frame power limitation is not exceeded, provided the final bit error rate is not increased beyond the desired amount. Furthermore, in certain circumstances where one or more slots are subjected to robbed bits and other slots are not subjected to robbed, it may be possible according to the invention to change the distribution of points per slot (e.g., subtract one or more points from the constellation(s) of the robbed bit slot(s), and add one or more points to the constellation(s) of the non-robbed-bit slot(s)), and to thereafter optimize either on error rate or data rate.

According to another aspect of the invention, a simple system for checking average constellation power is provided. As previously discussed, the average power of the PCM modem frame (six slots) must satisfy certain power restrictions. According to the V.90 standard, these restrictions range from –0.5 DBM0 to –16 dBm0 with decrements of 0.5 dBm. When a receiver designs constellations for a transmitter, both the receiver and transmitter should check whether the average frame power satisfies the corresponding restriction. Unfortunately, the formula for power calculation proposed in the V.90 standard is complex and requires considerable memory and processing resources.

Figure 9:
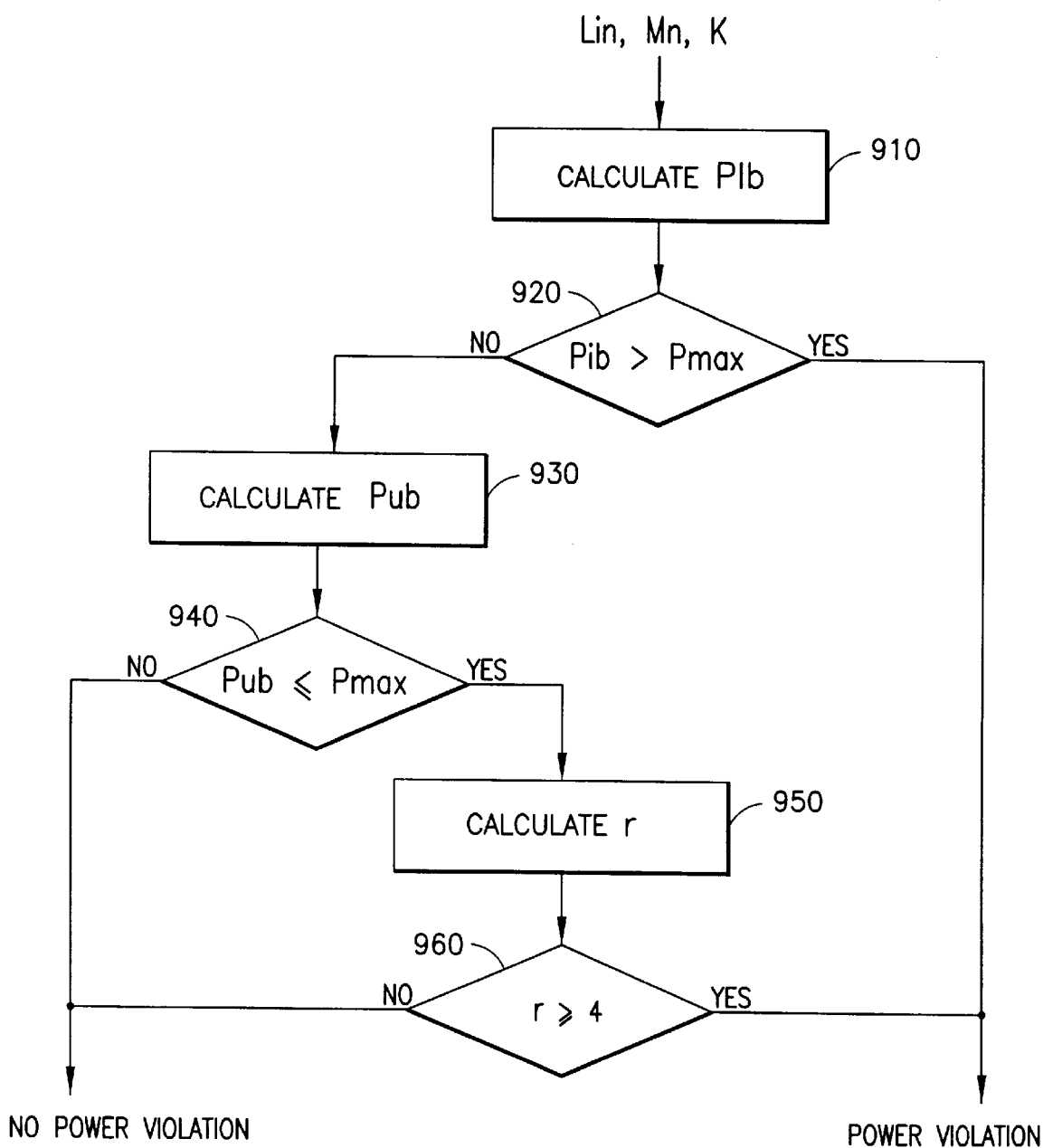
FIG. 9 is a flow chart of a method for checking the constellation power in a PCM modem.

According to the invention, an average frame power lower boundary Plb and an average frame power upper boundary Pub may be estimated and calculated according to:

$$Plb(dBm) = 10 \cdot \log(P/Po) \tag{29}$$

$$Pub(dBM) = Plb + 10 \log\left[2^{(-K)} \prod_{n=1}^{6} N0_k\right] \tag{30}$$

where P is the average frame power, with $$P = \left[\sum_{k=1}^{6} (1/N0_k) \sum_{i=1}^{N0_k} (Lik)^2\right] \Big/ 6, \tag{31}$$

and $Po = 1.6039690 \cdot 10^7$, Lik is the i-th level in the k-th constellation (as used in FIG. 8c), $N0_k$ is the number of positive levels in the k-th constellation (obtained from FIG. 8b), and K is the number of bits transmitted within the frame excluding the six sign bits. As seen in FIG. 9, at 910, Plb is calculated. At 920, Plb is compared to the Pmax which is the power restriction. If Plb exceeds Pmax, then a power violation is declared. If Plb does not exceed Pmax, then at 930, Pub is calculated. At 940, Pub is compared to Pmax. If Pub is greater than Pmax, then there is no power violation. However, if Pub is less than or equal to Pmax, then an indicator r is calculated at 950 according to $$r = |(Pmax - Pub)/(Pmax - Plb)| \tag{32}$$

If r is greater than or equal to four, as determined at 960, then a power violation is declared. Otherwise, there is no power violation.

There have been described and illustrated herein methods for the design of translation tables and constellations in a PCM modem receiver. While particular embodiments of the invention has been described, it is not intended that the invention be limited thereto, as it is intended that the invention be as broad in scope as the art will allow and that the specification be read likewise. Thus, while various aspects of the methods of the invention have been described as being conducted in separate steps according to a particular order, it will be appreciated that in many cases the order of steps is not necessarily critical, and that various steps can be combined or subdivided as desired. Also, while the invention was described with particular reference to a six slot frame for V.90 modems, it will be appreciated that various aspects of the invention have applicability to other digital modems which may have a different number of slots. Further, while various aspects of the invention relating to constellation design and optimization were described with respect to optimizing modem reliability, it will be appreciated that similar aspects of the invention can be utilized in order to optimize data rate, or to increase both data rate and reliability without optimizing specifically with respect to either. Further yet, while the invention was described primarily with respect to software flow charts, it will be appreciated that the invention can be carried out in apparatus including hardware, firmware, software, or a combination thereof as is well known in the art. It will therefore be appreciated by those skilled in the art that yet other modifications could be made to the provided invention without deviating from its spirit and scope as so claimed.

We claim:

1. A method for generating at least one translation table for a modem having a frame having a plurality of slots, comprising steps:
   a) obtaining digital impairment learning (DIL) sequence information from another modem;
   b) from said DIL sequence information, generating at least one ordered table of levels;
   c) finding distances between adjacent levels of said ordered table for each slot;
   d) utilizing said distances to distinguish between slots subject to robbed bit signaling (RBS) and slots not subject to RBS;
   e) using said at least one ordered table of levels to make a determination as to whether said DIL sequence information is A-law or μ-law information;
   f) using said determination as to whether said DIL sequence information is A-law or μ-law information, determining at least one scaling factor; and
   g) using said at least one scaling factor, generating said at least one translation table.

2. A method according to claim 1, wherein:
said step of determining at least one scaling factor comprises averaging corresponding levels of slots not subject to RBS.

3. A method according to claim 2, wherein:
said step of determining at least one scaling factor further comprises estimating PAD impairment for at least one slot.

4. A method according to claim 2, wherein:
said averaged levels are used in said determination as to whether said DIL sequence information is A-law or μ-law information.

5. A method according to claim 1, further comprising:
determining which of said slots subject to RBS is subject to α-type RBS and which is subject to β-type RBS, and utilizing said determining in said generating said at least one translation table.

6. A method for generating scaling factors for a modem having a frame having a plurality of slots, comprising steps:
   a) obtaining digital impairment learning (DIL) sequence information from another modem;
   b) from said DIL sequence information, generating at least one ordered table of levels;
   c) finding a plurality of distances between adjacent levels of said ordered table for each slot;
   d) utilizing substantially only typical distances of said plurality of distances between adjacent levels in order to find at least one scaling factor.

7. A method according to claim 6, wherein:
said utilizing comprises choosing a plurality of largest distances $M_x$ for said slot, and for each of said plurality of largest distances, comparing said plurality of distances to first ranges about said plurality of largest distances to find a first set of said plurality of distances falling inside said first ranges.

8. A method according to claim 7, wherein:
said first ranges include an upper bound and a lower bound, said upper bound is equal to $M_x(1+\Delta)$, and said lower bound is equal to $M_x(1-\Delta)$, where $0.05 \leq \Delta \leq 0.10$.

9. A method according to claim 8, wherein:
said utilizing further comprises finding a second set of distances falling within a second range by comparing twice the value of each of said plurality of distances to said second range.

10. A method according to claim 9, wherein:
said second range is determined by averaging said first set of distances falling inside said ranges and using said averaged first set of distances to find a second upper bound and a second lower bound.

11. A method according to claim 9, wherein:
said utilizing further comprises summing the number of distances in at least said first set and said second set.

12. A method according to claim 11, wherein:
said utilizing further comprises find a third set of distances falling within a third range, a fourth set of distances falling within a fourth range, and a fifth set of distances falling within a fifth range, and said summing comprises summing the number of distances in said first through fifth sets.

13. A method according to claim 12, wherein:
said utilizing further comprises using the largest of a plurality of sums relating to sums for each distance $M_x$.

14. A method according to claim 13, wherein:
said utilizing further comprises separately averaging said third, fourth and fifth sets of distances, and finding a refined average distance $avM_x$ which is a function of said first through fifth average distances.

15. A method of selecting a scaling factor for a modem having a frame having a plurality of slots, comprising steps:
   a) obtaining digital impairment learning (DIL) sequence information from another modem;
   b) from said DIL sequence information, generating at least one ordered table of levels;
   c) finding a non-robbed-bit signaling (RBS) slot of said plurality of slots;
   d) for at least said RBS slot, calculating a PAD estimation function utilizing said ordered table of levels;
   e) comparing a function of said PAD estimation function to at least one threshold to find an indication of PAD attenuation; and
   f) choosing a scaling factor based on said indication of PAD attenuation.

16. A method according to claim 15, wherein:
said PAD estimation function is $$F2(n1, n2) = \sum_{i=n1}^{i=n2} \text{abs}\{L(i) - 2^y * [L(i - 16y)]\},$$

greater than zero, and L(i) is the i-th positive level received in said RBS slot.

17. A method according to claim 16, wherein:

n1 equals 33, and n2 equals 58.

18. A method according to claim 15, wherein:

said function of said PAD estimation function is a bias corrected function.

19. A method according to claim 18, wherein:

said bias correction function utilizes a bias correction $B_{Alaw}(SNR)$ which is zero for A-law signals if the signal to noise ratio (SNR) is greater than 40 dB, and 5(40−SNR(dB)) otherwise for A-law signals.

20. A method according to claim 15, wherein:

said at least one threshold comprises a series of thresholds.

21. A method according to claim 20, wherein:

said series of threshold includes values of 34, 48, 63, 84, and 106.

22. A method according to claim 20, wherein:

said series of thresholds are used to distinguish PAD attenuation varying by 6 dB.

23. A method according to claim 22 wherein:

said final scaling factor is a function of whether or not said PAD attenuation is less than 6 dB.

24. A method according to claim 16, wherein:

n1 equals 64, and n2 equals 128.

25. A method according to claim 18, wherein:

said bias correction function utilizes a bias correction $B_\mu(SNR)$ which is 0 when SNR>40 dB for a substantially linear $\mu$-law channel, and 15(40−SNR(dB)) if the SNR$\leq$40 dB.

26. A method of selecting a scaling factor for a modem having a frame having a plurality of slots, comprising steps:

a) obtaining digital impairment learning (DIL) sequence information from another modem;

b) from said DIL sequence information, generating at least one ordered table of levels;

c) utilizing a distance function $Ldel(i,\Delta)=L(i)-2L(i-\Delta)$ to find commonly recurring distances LdelC, where L(i) is the value of the i-th level of said ordered table of levels, and $\Delta$ is a given shift between compared indexes;

d) determining a threshold Th1;

e) comparing distances Ldel(i,16) to said threshold Th1 and averaging said distances Ldel(i,16) which exceed Th1;

f) utilizing said average value as an estimate D1 in selecting a scaling factor.

27. A method according to claim 26, wherein:

said comparing comprises comparing for indices $i=i_{min}$ to $i=(i_{min}+N_i)$ said distances Ldel(i,16).

* * * * *

UNITED STATES PATENT AND TRADEMARK OFFICE
CERTIFICATE OF CORRECTION

PATENT NO. : 6,185,249 B1
DATED : February 6, 2001
INVENTOR(S) : Drucker et al.

It is certified that error appears in the above-identified patent and that said Letters Patent is hereby corrected as shown below:

Item [73] Assignee: PC TEL Inc., San Jose, CA (US).

Signed and Sealed this

Twenty-first Day of August, 2001

Attest:

NICHOLAS P. GODICI
*Attesting Officer*     *Acting Director of the United States Patent and Trademark Office*